(12) United States Patent
Wantland

(10) Patent No.: US 11,503,776 B2
(45) Date of Patent: Nov. 22, 2022

(54) METHOD OF OPERATING A SEALED SYSTEM FOR AN INDOOR GARDEN CENTER

(71) Applicant: Haier US Appliance Solutions, Inc., Wilmington, DE (US)

(72) Inventor: Louis A. Wantland, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 0 days.

(21) Appl. No.: 17/111,575

(22) Filed: Dec. 4, 2020

(65) Prior Publication Data

US 2022/0174889 A1 Jun. 9, 2022

(51) Int. Cl.
*A01G 9/24* (2006.01)

(52) U.S. Cl.
CPC ............ *A01G 9/246* (2013.01); *A01G 9/247* (2013.01)

(58) Field of Classification Search
CPC ................................ A01G 9/246; A01G 31/02
See application file for complete search history.

(56) References Cited

U.S. PATENT DOCUMENTS

| | | | |
|---|---|---|---|
| 8,782,948 B2 | 7/2014 | Harwood et al. | |
| 8,910,419 B1* | 12/2014 | Oberst | A01G 31/06 47/60 |
| 9,974,243 B2 | 5/2018 | Martin | |
| 2009/0293349 A1* | 12/2009 | Dunbar | A01G 9/16 47/20.1 |
| 2011/0054921 A1* | 3/2011 | Lynds | G06Q 10/04 705/1.1 |
| 2017/0064912 A1 | 3/2017 | Tabakman | |
| 2017/0094920 A1* | 4/2017 | Ellins | A01G 31/02 |
| 2019/0183062 A1* | 6/2019 | Pham | A01G 9/022 |
| 2020/0037514 A1* | 2/2020 | Massey | A01G 9/249 |
| 2020/0323157 A1* | 10/2020 | English | A01G 31/06 |
| 2020/0352113 A1* | 11/2020 | Canipe | A01G 25/16 |
| 2020/0356078 A1* | 11/2020 | Edelkhani | A01G 7/02 |
| 2020/0404862 A1* | 12/2020 | Bowles | F25B 21/04 |
| 2021/0161083 A1* | 6/2021 | McLeod | G05B 19/41835 |

FOREIGN PATENT DOCUMENTS

| | | | |
|---|---|---|---|
| CA | 290823 A1 | 3/2017 | |
| CN | 109906787 A * | 6/2019 | |
| CN | 109997572 A | 7/2019 | |
| CN | 111771616 A * | 10/2020 | |
| KR | 100754772 B1 * | 9/2007 | |
| KR | 2018/0026954 A | 3/2018 | |
| WO | WO-2020102400 A1 * | 5/2020 | ............ A01G 9/24 |
| WO | WO-2020227712 A1 * | 11/2020 | ............ A01G 31/02 |

\* cited by examiner

*Primary Examiner* — Magdalena Topolski
*Assistant Examiner* — Katherine Anne Kloecker
(74) *Attorney, Agent, or Firm* — Dority & Manning, P.A.

(57) ABSTRACT

An indoor gardening appliance includes a liner defining a grow chamber, a grow module rotatably mounted within the grow chamber for receiving a plurality of plant pods, and a sealed system for regulating chamber temperature. A controller is configured for operating the sealed system to maintain the grow chamber at a grow temperature, obtaining a scheduled harvest time, determining a chill cycle including a predetermined chill time and a pre-harvest chill temperature based at least in part on the scheduled harvest time, and operating the sealed system to implement the chill cycle by regulating a chamber temperature to the pre-harvest chill temperature during the predetermined chill time.

19 Claims, 15 Drawing Sheets

METHOD OF OPERATING A SEALED SYSTEM FOR AN INDOOR GARDEN CENTER

FIELD OF THE INVENTION

The present subject matter relates generally to systems for gardening plants indoors, and more particularly, to a system and method for implementing a frost cycle for improved quality of harvested plants from an indoor gardening appliance.

BACKGROUND OF THE INVENTION

Conventional indoor garden centers include a cabinet defining a grow chamber having a number of trays or racks positioned therein to support seedlings or plant material, e.g., for growing herbs, vegetables, or other plants in an indoor environment. In addition, such indoor garden centers may include an environmental control system that maintains the growing chamber at a desired temperature or humidity. Certain indoor garden centers may also include hydration systems for watering the plants and/or artificial lighting systems that provide the light necessary for such plants to grow.

Notably, certain plants, crops, or vegetables may exhibit an improved taste after a frost, e.g., where the temperature drops below a certain threshold such as 36° F. or below. For example, certain cold, hearty crops, such as parsnips, carrots, beets, brussel sprouts, kale, cabbage, and rutabagas might have improved taste. In this regard, frost may cause these plants to produce sugars and improves the taste. However, conventional indoor gardening centers are not capable of initiating such a frost, as they rely on ambient room air and have little control over temperature. Moreover, conventional sealed systems used in indoor garden centers are not capable of independently regulating the temperature of multiple chambers, and must therefore maintain the entire grow chamber at a temperature suitable for all plants located therein.

Accordingly, an improved indoor garden center would be useful. More particularly, an indoor garden center with a sealed refrigeration system and method of operation for selectively implementing a frost would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a gardening appliance is provided including a liner positioned within a cabinet and defining a grow chamber, a grow module mounted within the liner and defining a plurality of apertures for receiving one or more plant pods, a sealed system in thermal communication with the grow chamber for regulating a temperature within the grow chamber, and a controller operably coupled to the sealed system. The controller is configured to operate the sealed system to maintain the grow chamber at a grow temperature, obtain a scheduled harvest time, determine a chill cycle including a predetermined chill time and a pre-harvest chill temperature based at least in part on the scheduled harvest time, and operate the sealed system to implement the chill cycle by regulating a chamber temperature to the pre-harvest chill temperature during the predetermined chill time.

In another exemplary embodiment, a method of operating a sealed system of a gardening appliance is provided. The gardening appliance includes a grow chamber, a grow module rotatably mounted within the grow chamber, and a sealed system in thermal communication with the grow chamber for regulating a temperature within the grow chamber. The method includes operating the sealed system to maintain the grow chamber at a grow temperature, obtaining a scheduled harvest time, determining a chill cycle including a predetermined chill time and a pre-harvest chill temperature based at least in part on the scheduled harvest time, and operating the sealed system to implement the chill cycle by regulating a chamber temperature to the pre-harvest chill temperature during the predetermined chill time.

According to still another embodiment, a gardening appliance is provided including a liner positioned within a cabinet and defining a grow chamber, a grow module mounted within the liner and defining a plurality of apertures for receiving a plant pod containing seeds, a sealed system in thermal communication with the grow chamber for regulating a temperature within the grow chamber, and a controller operably coupled to the sealed system. The controller is configured to operate the sealed system to maintain the grow chamber at a grow temperature, determine a germination chill cycle including a predetermined germination chill time and a germination chill temperature based on the seeds contained in the plant pod, and operate the sealed system to implement the germination chill cycle by regulating a chamber temperature to the germination chill temperature during the predetermined germination chill time.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
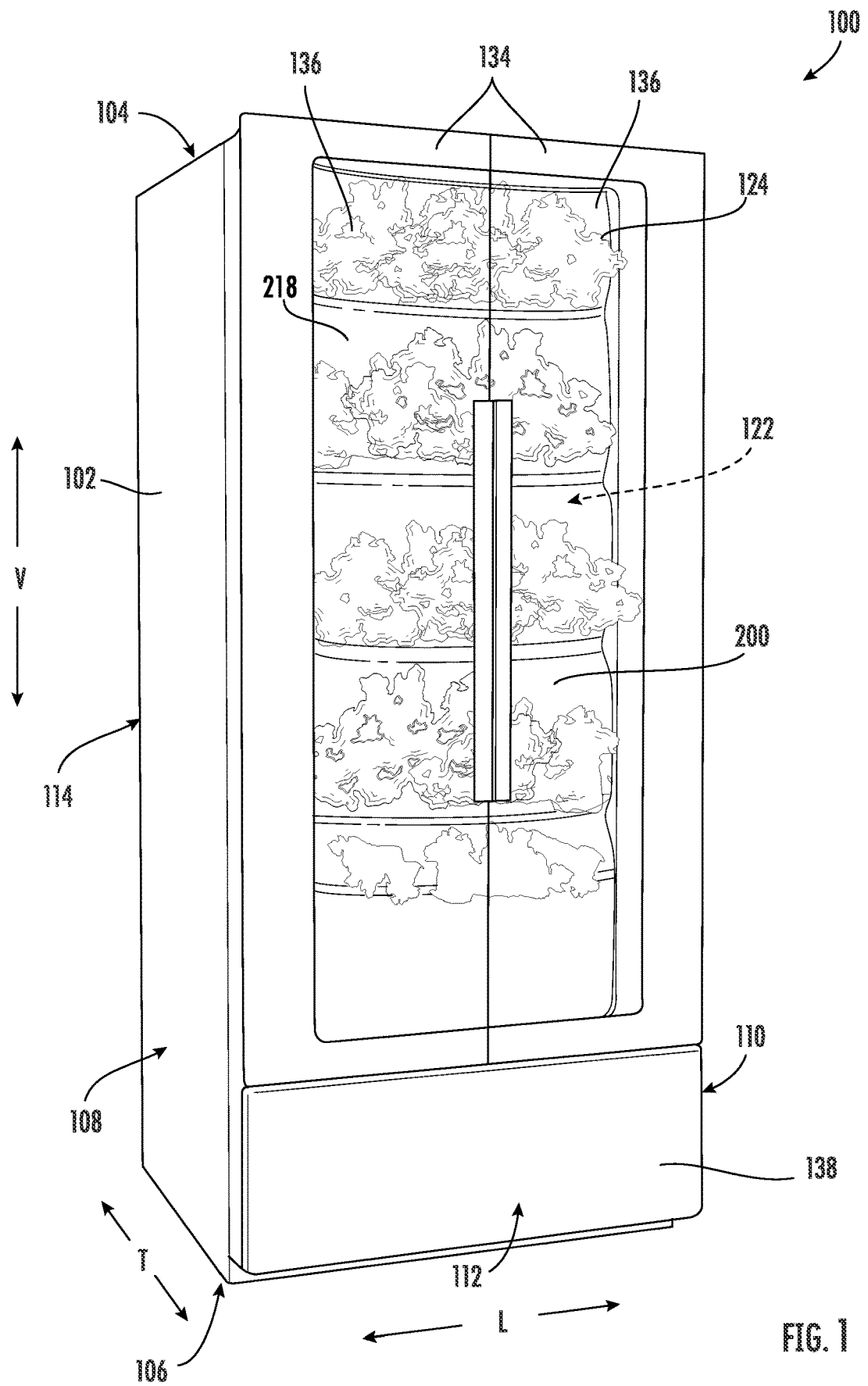
FIG. 1 provides a perspective view of a gardening appliance according to an exemplary embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "approximately," "substantially," or "about," refer to being within a ten percent (10%) margin of error of the stated value. Moreover, as used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

FIG. 1 provides a front view of a gardening appliance 100 according to an exemplary embodiment of the present subject matter. According to exemplary embodiments, gardening appliance 100 may be used as an indoor garden center for growing plants. It should be appreciated that the embodiments described herein are intended only for explaining aspects of the present subject matter. Variations and modifications may be made to gardening appliance 100 while remaining within the scope of the present subject matter.

Gardening appliance 100 includes a housing or cabinet 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another and form an orthogonal direction system.

Gardening appliance 100 may include an insulated liner 120 positioned within cabinet 102. Liner 120 may at least partially define a temperature controlled, referred to herein generally as a grow chamber 122, within which plants 124 may be grown. Although gardening appliance 100 is referred to herein as growing plants 124, it should be appreciated that other organisms or living things may be grown or stored in gardening appliance 100. For example, algae, fungi (e.g., including mushrooms), or other living organisms may be grown or stored in gardening appliance 100. The specific application described herein is not intended to limit the scope of the present subject matter.

Cabinet 102, or more specifically, liner 120 may define a substantially enclosed back region or portion 130. In addition, cabinet 102 and liner 120 may define a front opening, referred to herein as front display opening 132, through which a user of gardening appliance 100 may access grow chamber 122, e.g., for harvesting, planting, pruning, or otherwise interacting with plants 124. According to an exemplary embodiment, enclosed back portion 130 may be defined as a portion of liner 120 that defines grow chamber 122 proximate rear side 114 of cabinet 102. In addition, front display opening 132 may generally be positioned proximate or coincide with front side 112 of cabinet 102.

Figure 2:
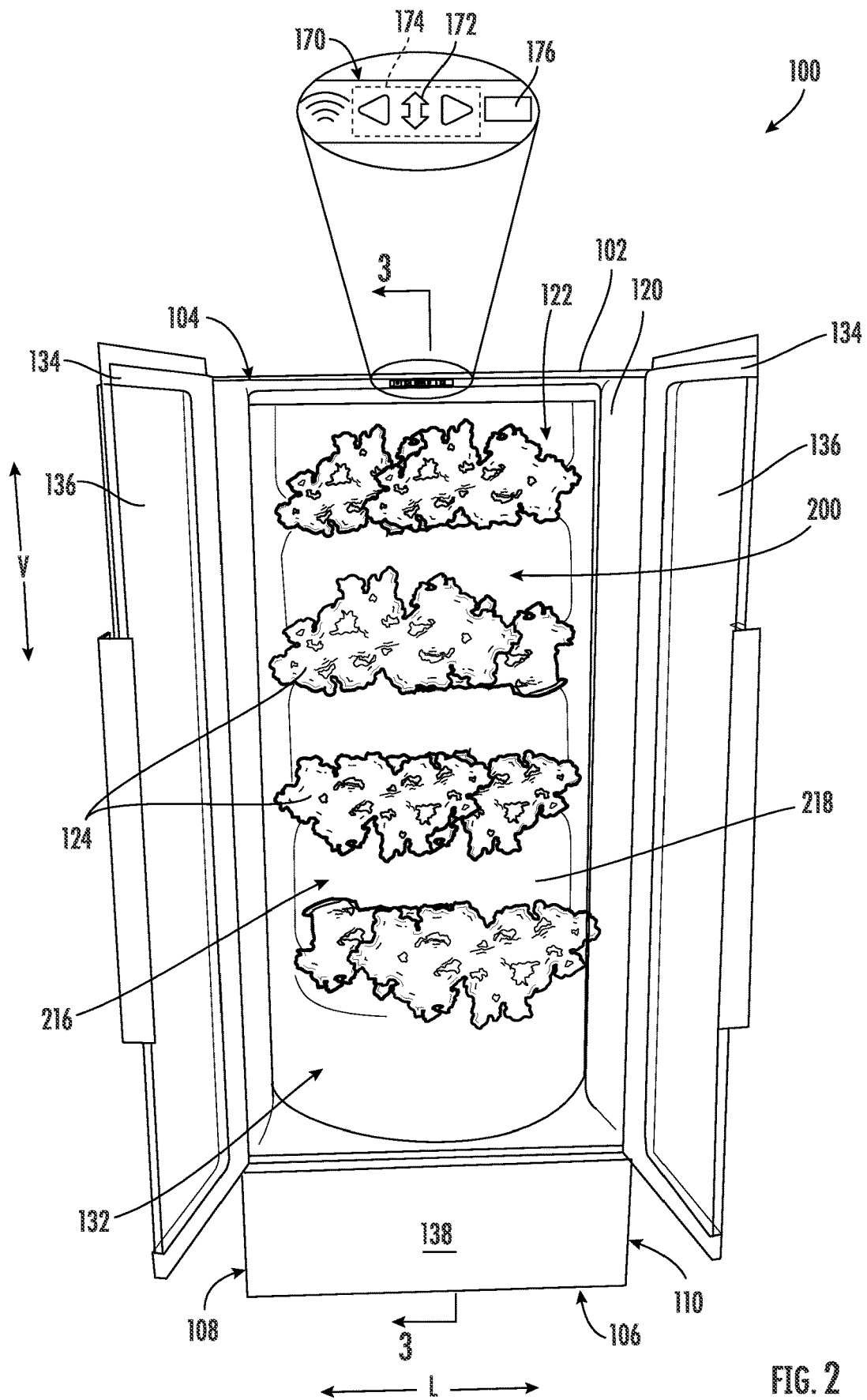
FIG. 2 depicts a front view of the exemplary gardening appliance of FIG. 1 with the doors open according to an exemplary embodiment of the present subject matter.

Gardening appliance 100 may further include one or more doors 134 that are rotatably mounted to cabinet 102 for providing selective access to grow chamber 122. For example, FIG. 1 illustrates doors 134 in the closed position such that they may help insulate grow chamber 122. By contrast, FIG. 2 illustrates doors 134 in the open positioned for accessing grow chamber 122 and plants 124 stored therein. Doors 134 may further include a transparent window 136 through which a user may observe plants 124 without opening doors 134.

Although doors 134 are illustrated as being rectangular and being mounted on front side 112 of cabinet 102 in FIGS. 1 and 2, it should be appreciated that according to alternative embodiments, doors 134 may have different shapes, mounting locations, etc. For example, doors 134 may be curved, may be formed entirely from glass, etc. In addition, doors 134 may have integral features for controlling light passing into and/or out of grow chamber 122, such as internal louvers, tinting, UV treatments, polarization, etc. One skilled in the art will appreciate that other chamber and door configurations are possible and within the scope of the present invention.

According to the illustrated embodiment, cabinet 102 further defines a drawer 138 positioned proximate bottom 106 of cabinet 102 and being slidably mounted to cabinet for providing convenient storage for plant nutrients, system accessories, water filters, etc. In addition, behind drawer 138 is a mechanical compartment 140 for receipt of an environmental control system including a sealed system for regulating the temperature within grow chamber 122, as described in more detail below.

Figure 3:
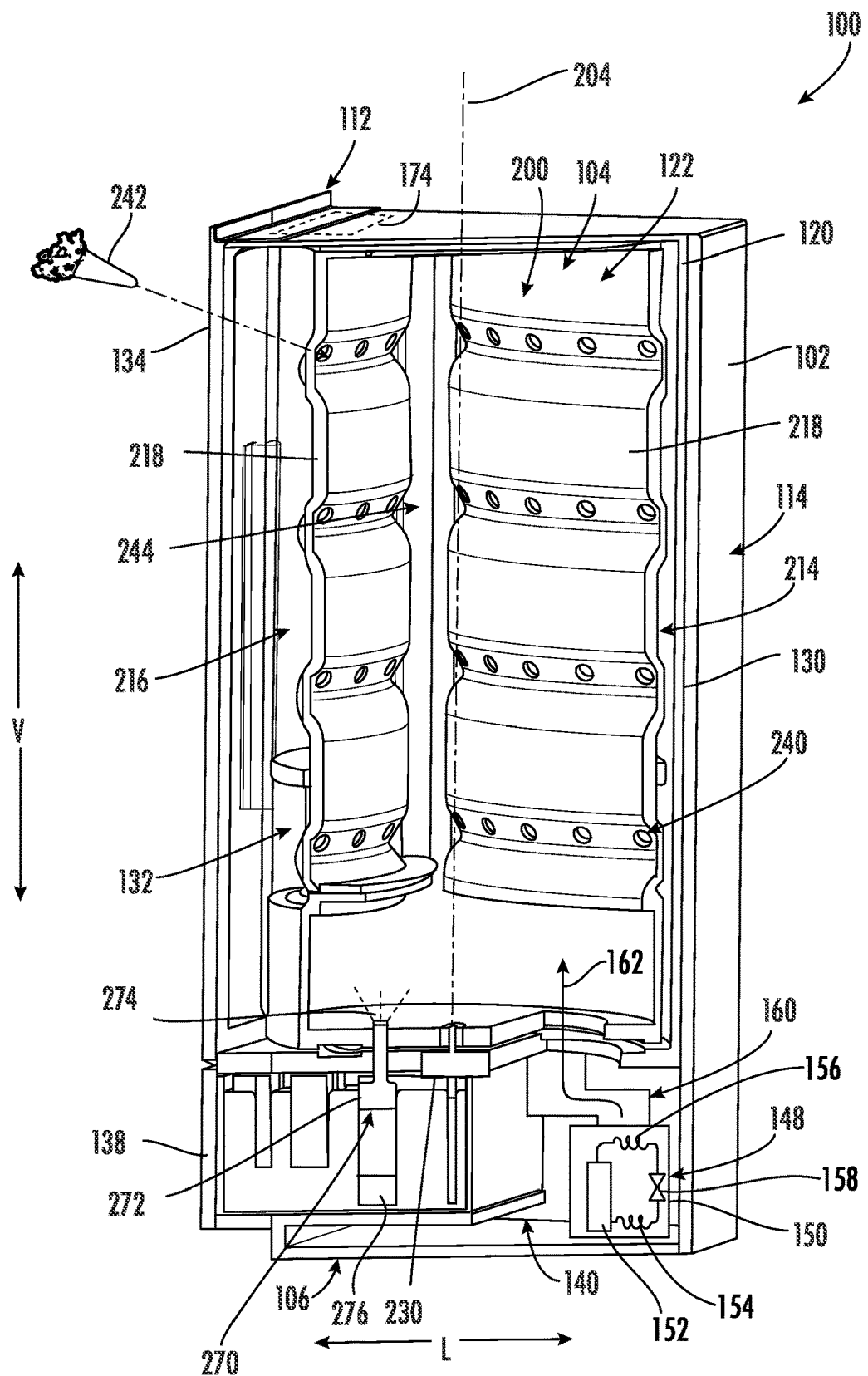
FIG. 3 is a cross sectional view of the exemplary gardening appliance of FIG. 1, taken along Line 3-3 from FIG. 2 with an internal divider removed for clarity.

FIG. 3 provides a schematic view of certain components of an environmental control system 148 that may be used to regulate a temperature within grow chamber 122. Specifically, environmental control system 148 may include a sealed system 150, a duct system 160, and a hydration system 270, or any other suitable components or subsystems for regulating an environment within grow chamber 122, e.g., for facilitating improved or regulated growth of plants 124 positioned therein. Specifically, FIG. 3 illustrates sealed system 150 within mechanical compartment 140. Although an exemplary sealed system is illustrated and described herein, it should be appreciated that variations and modifications may be made to sealed system 150 while remaining within the scope of the present subject matter. For example, sealed system 150 may include additional or alternative components, different ducting configurations, etc.

As shown, sealed system 150 includes a compressor 152, a first heat exchanger or evaporator 154 and a second heat exchanger or condenser 156. As is generally understood, compressor 152 is generally operable to circulate or urge a flow of refrigerant through sealed system 150, which may include various conduits which may be utilized to flow refrigerant between the various components of sealed system 150. Thus, evaporator 154 and condenser 156 may be between and in fluid communication with each other and compressor 152.

During operation of sealed system 150, refrigerant flows from evaporator 154 and to compressor 152, and compressor 152 is generally configured to direct compressed refrigerant from compressor 152 to condenser 156. For example, refrigerant may exit evaporator 154 as a fluid in the form of a superheated vapor. Upon exiting evaporator 154, the refrigerant may enter compressor 152, which is operable to compress the refrigerant. Accordingly, the pressure and temperature of the refrigerant may be increased in compressor 152 such that the refrigerant becomes a more superheated vapor.

Condenser 156 is disposed downstream of compressor 152 and is operable to reject heat from the refrigerant. For example, the superheated vapor from compressor 152 may enter condenser 156 and transfer energy to air surrounding condenser 156 (e.g., to create a flow of heated air). In this manner, the refrigerant condenses into a saturated liquid and/or liquid vapor mixture. A condenser fan (not shown) may be positioned adjacent condenser 156 and may facilitate or urge the flow of heated air across the coils of condenser 156 (e.g., from ambient atmosphere) in order to facilitate heat transfer.

According to the illustrated embodiment, an expansion device or a variable electronic expansion valve 158 may be further provided to regulate refrigerant expansion. During use, variable electronic expansion valve 158 may generally expand the refrigerant, lowering the pressure and temperature thereof. In this regard, refrigerant may exit condenser 156 in the form of high liquid quality/saturated liquid vapor mixture and travel through variable electronic expansion valve 158 before flowing through evaporator 154. Variable electronic expansion valve 158 is generally configured to be adjustable, e.g., such that the flow of refrigerant (e.g., volumetric flow rate in milliliters per second) through variable electronic expansion valve 158 may be selectively varied or adjusted.

Evaporator 154 is disposed downstream of variable electronic expansion valve 158 and is operable to heat refrigerant within evaporator 154, e.g., by absorbing thermal energy from air surrounding the evaporator (e.g., to create a flow of cooled air). For example, the liquid or liquid vapor mixture refrigerant from variable electronic expansion valve 158 may enter evaporator 154. Within evaporator 154, the refrigerant from variable electronic expansion valve 158 receives energy from the flow of cooled air and vaporizes into superheated vapor and/or high quality vapor mixture. An air handler or evaporator fan (not shown) is positioned adjacent evaporator 154 and may facilitate or urge the flow of cooled air across evaporator 154 in order to facilitate heat transfer. From evaporator 154, refrigerant may return to compressor 152 and the vapor-compression cycle may continue.

As explained above, environmental control system 148 includes a sealed system 150 for providing a flow of heated air or a flow cooled air throughout grow chamber 122 as needed. To direct this air, environmental control system 148 includes a duct system 160 for directing the flow of temperature regulated air, identified herein simply as flow of air 162 (see, e.g., FIG. 3). In this regard, for example, an evaporator fan can generate a flow of cooled air as the air passes over evaporator 154 and a condenser fan can generate a flow of heated air as the air passes over condenser 156.

These flows of air 162 are routed through a cooled air supply duct and/or a heated air supply duct (not shown), respectively. In this regard, it should be appreciated that environmental control system 148 may generally include a plurality of ducts, dampers, diverter assemblies, and/or air handlers to facilitate operation in a cooling mode, in a heating mode, in both a heating and cooling mode, or any other mode suitable for regulating the environment within grow chamber 122. It should be appreciated that duct system 160 may vary in complexity and may regulate the flows of air from sealed system 150 in any suitable arrangement through any suitable portion of grow chamber 122.

Gardening appliance 100 may include a control panel 170. Control panel 170 includes one or more input selectors 172, such as e.g., knobs, buttons, push buttons, touchscreen interfaces, etc. In addition, input selectors 172 may be used to specify or set various settings of gardening appliance 100, such as e.g., settings associated with operation of sealed system 150. Input selectors 172 may be in communication with a processing device or controller 174. Control signals generated in or by controller 174 operate gardening appliance 100 in response to input selectors 172. Additionally, control panel 170 may include a display 176, such as an indicator light or a screen. Display 176 is communicatively coupled with controller 174 and may display information in response to signals from controller 174. Further, as will be described herein, controller 174 may be communicatively coupled with other components of gardening appliance 100, such as e.g., one or more sensors, motors, or other components.

As used herein, "processing device" or "controller" may refer to one or more microprocessors or semiconductor devices and is not restricted necessarily to a single element. The processing device can be programmed to operate gardening appliance 100. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations.

Referring now generally to FIGS. 1 through 8, gardening appliance 100 generally includes a rotatable carousel, referred to herein as a grow module 200 that is mounted within liner 120, e.g., such that it is within grow chamber 122. As illustrated, grow module 200 includes a central hub 202 that extends along and is rotatable about a central axis 204. Specifically, according to the illustrated embodiment, central axis 204 is parallel to the vertical direction V. However, it should be appreciated that central axis 204 could alternatively extend in any suitable direction, e.g., such as the horizontal direction. In this regard, grow module 200 generally defines an axial direction, i.e., parallel to central axis 204, a radial direction R that extends perpendicular to central axis 204, and a circumferential direction C that extends around central axis 204 (e.g. in a plane perpendicular to central axis 204).

Grow module 200 may further include a plurality of partitions 206 that extend from central hub 202 substantially along the radial direction R. In this manner, grow module 200 defines a plurality of chambers, referred to herein generally by reference numeral 210, by dividing or partitioning grow chamber 122. Referring specifically to a first embodiment of grow module 200 illustrated in FIGS. 1 through 8, grow module 200 includes three partitions 206 to define a first chamber 212, a second chamber 214, and a third chamber 216, which are circumferentially spaced relative to each other. In general, as grow module 200 is rotated within grow chamber 122, the plurality of chambers 210 define substantially separate and distinct growing environments, e.g., for growing plants 124 having different growth needs.

More specifically, partitions 206 may extend from central hub 202 to a location immediately adjacent liner 120. Although partitions 206 are described as extending along the radial direction, it should be appreciated that they need not be entirely radially extending. For example, according to the illustrated embodiment, the distal ends of each partition is joined with an adjacent partition using an arcuate wall 218, which is generally used to support plants 124.

Notably, it is desirable according to exemplary embodiments to form a substantial seal between partitions 206 and liner 120. Therefore, according to an exemplary embodiment, grow module 200 may define a grow module diameter 220 (e.g., defined by its substantially circular footprint formed in a horizontal plane). Similarly, enclosed back portion 130 of liner 120 may be substantially cylindrical and may define a liner diameter 222. In order to prevent a significant amount of air from escaping between partitions 206 and liner 120, liner diameter 222 may be substantially equal to or slightly larger than grow module diameter 220.

Referring now specifically to FIG. 3, gardening appliance 100 may further include a motor 230 or another suitable driving element or device for selectively rotating grow module 200 during operation of gardening appliance 100. In this regard, according to the illustrated embodiment, motor 230 is positioned below grow module 200, e.g., within mechanical compartment 140, and is operably coupled to grow module 200 along central axis 204 for rotating grow module 200.

As used herein, "motor" may refer to any suitable drive motor and/or transmission assembly for rotating grow module 200. For example, motor 230 may be a brushless DC electric motor, a stepper motor, or any other suitable type or configuration of motor. For example, motor 230 may be an AC motor, an induction motor, a permanent magnet synchronous motor, or any other suitable type of AC motor. In addition, motor 230 may include any suitable transmission assemblies, clutch mechanisms, or other components.

According to an exemplary embodiment, motor 230 may be operably coupled to controller 174, which is programmed to rotate grow module 200 according to predetermined operating cycles, based on user inputs (e.g. via touch buttons 172), etc. In addition, controller 174 may be communicatively coupled to one or more sensors, such as temperature or humidity sensors, positioned within the various chambers 210 for measuring temperatures and/or humidity, respectively. Controller 174 may then operate motor 230 in order to maintain desired environmental conditions for each of the respective chambers 210. For example, as will be described in more detail below, gardening appliance 100 includes features for providing certain locations of gardening appliance 100 with light, temperature control, proper moisture, nutrients, and other requirements for suitable plant growth. Motor 230 may be used to position specific chambers 210 where needed to receive such growth requirements.

According to an exemplary embodiment, such as where three partitions 206 form three chambers 212-216, controller 174 may operate motor 230 to index grow module 200 sequentially through a number of preselected positions. More specifically, motor 230 may rotate grow module 200 in a counterclockwise direction (e.g. when viewed from a top of grow module 200) in 120° increments to move chambers 210 between sealed positions and display positions. As used herein, a chamber 210 is considered to be in a "sealed position" when that chamber 210 is substantially sealed between grow module 200 (i.e., central hub 202 and adjacent partitions 206) and liner 120. By contrast, a chamber 210 is considered to be in a "display position" when that chamber 210 is at least partially exposed to front display opening 132, such that a user may access plants 124 positioned within that chamber 210.

Figure 4:
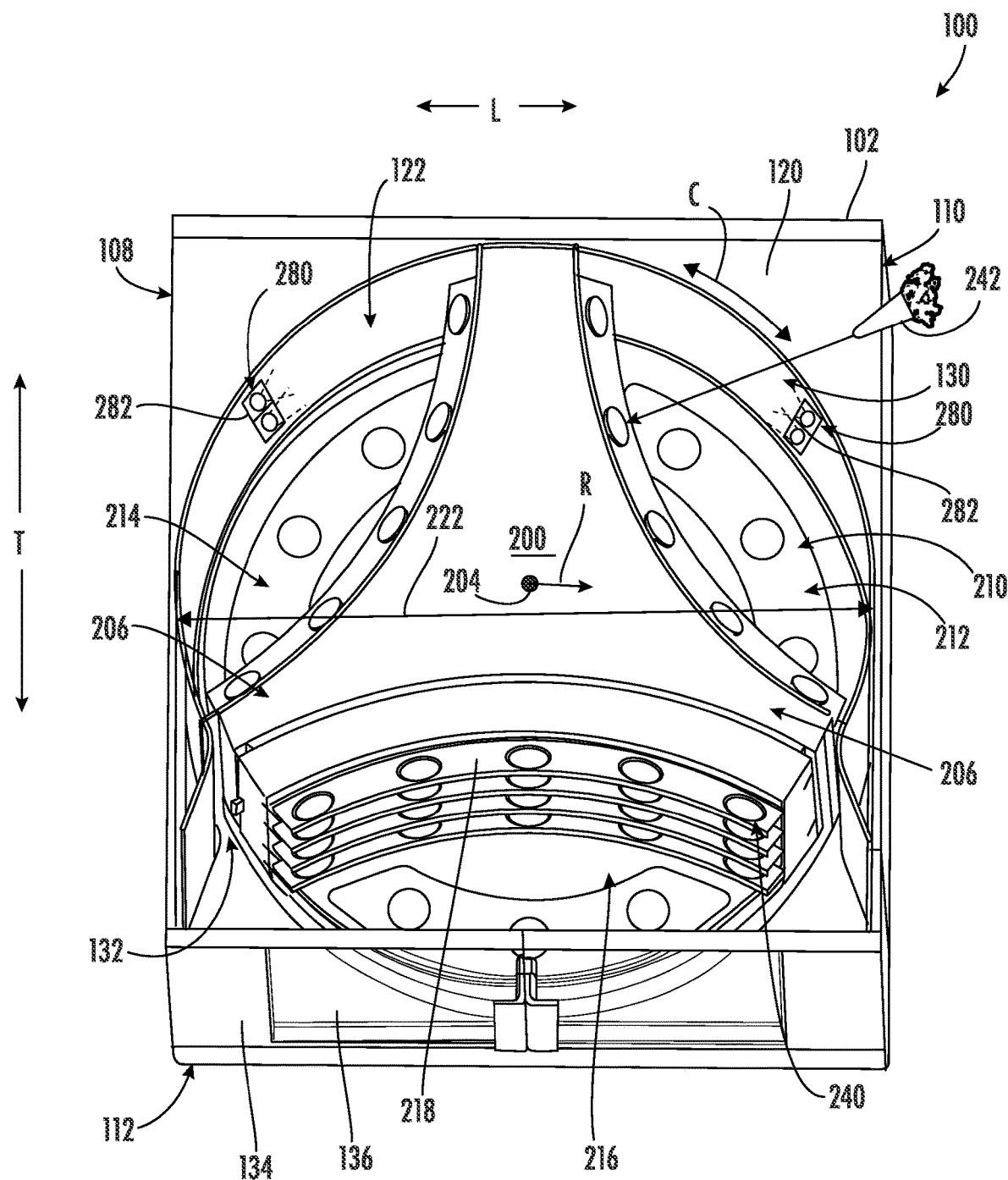
FIG. 4 is a top perspective view of the exemplary gardening appliance of FIG. 1, with the top panel of the cabinet removed to reveal a rotatable grow module according to an exemplary embodiment of the present subject matter.
Figure 5:
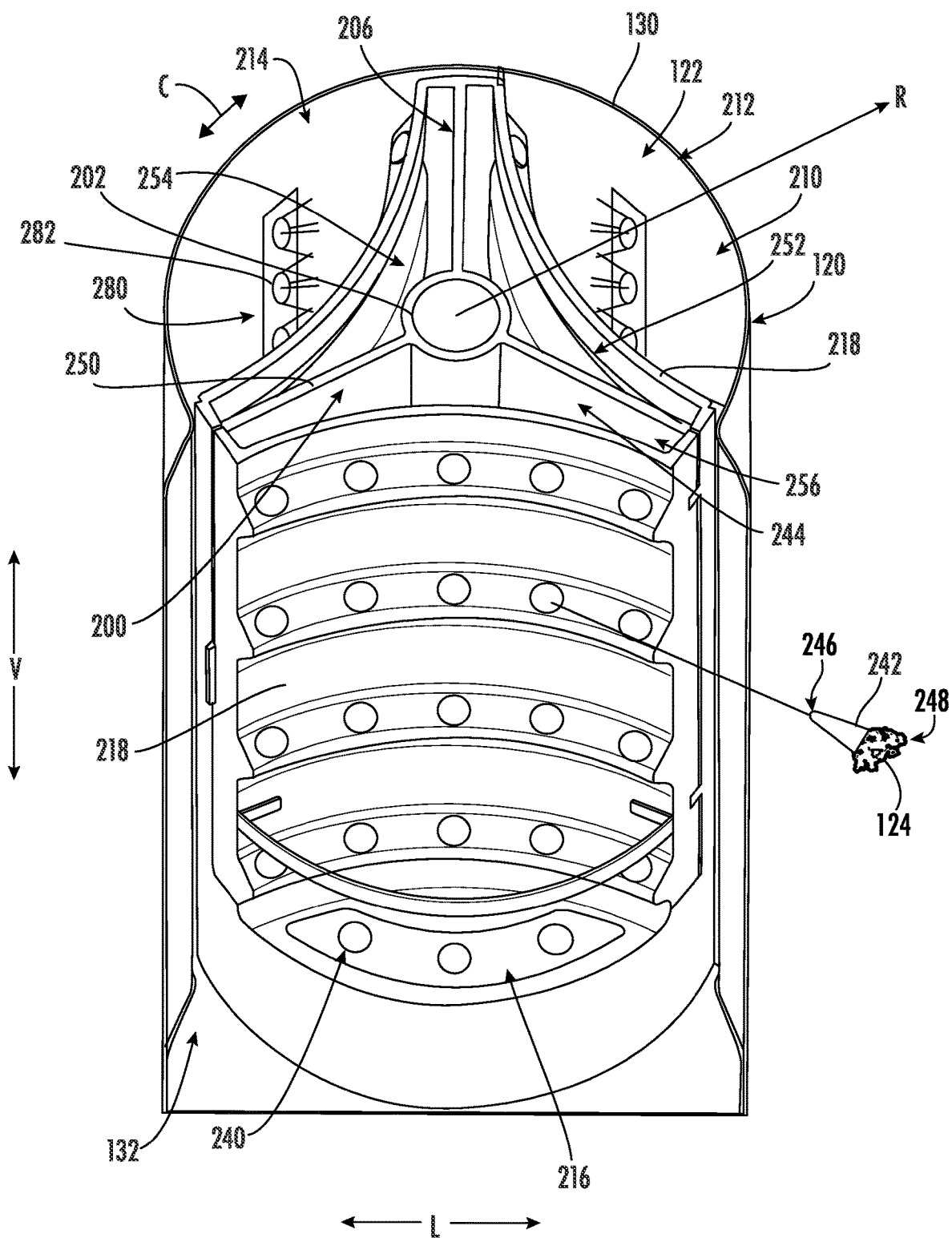
FIG. 5 provides a perspective cross sectional view of the exemplary gardening appliance of FIG. 1 according to another exemplary embodiment of the present subject matter.
Figure 6:
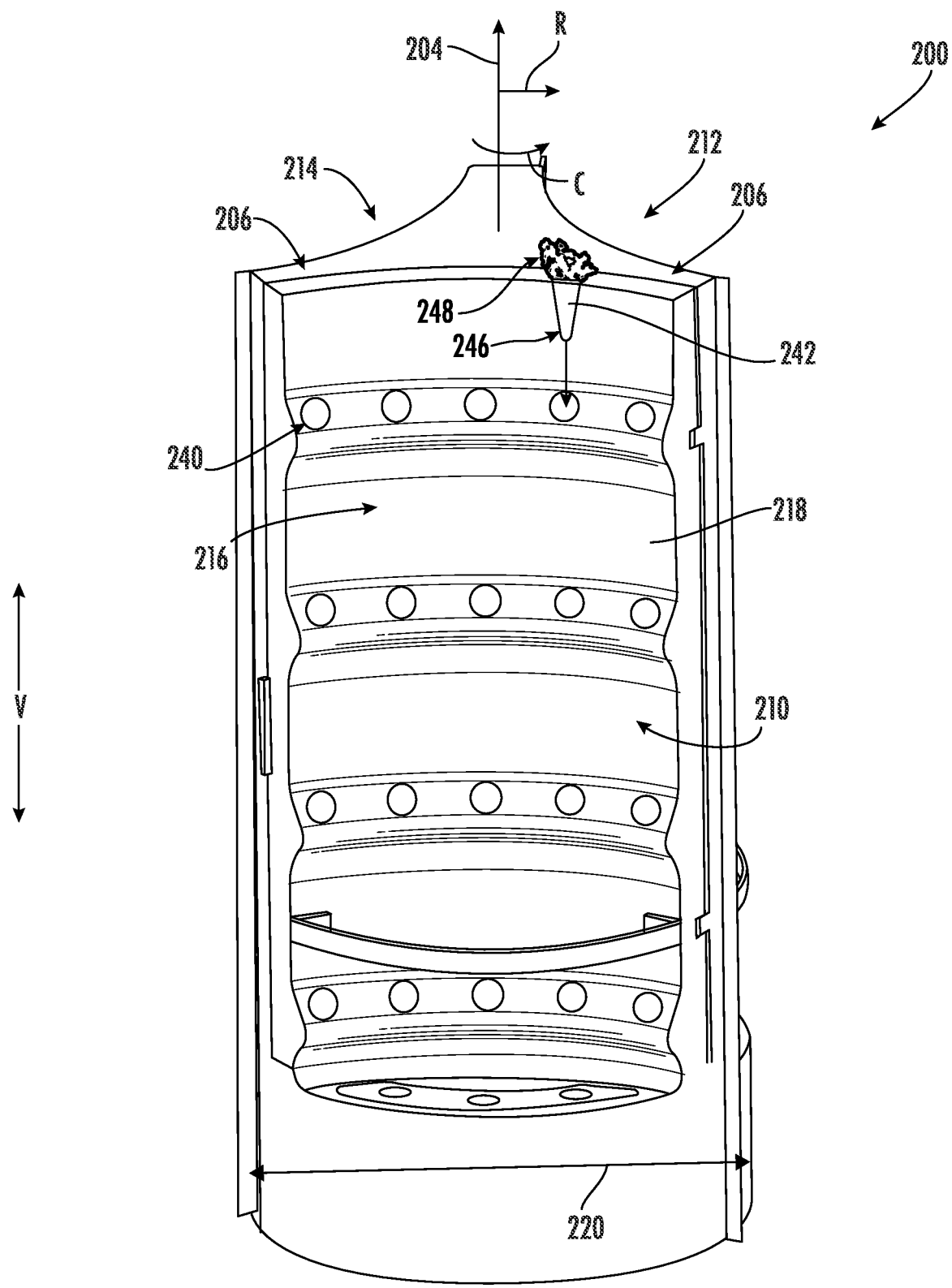
FIG. 6 provides a perspective view of the grow module of the exemplary gardening appliance of FIG. 1 according to another exemplary embodiment of the present subject matter.

For example, as illustrated in FIGS. 4 and 5, first chamber 212 and second chamber 214 are both in a sealed position, whereas third chamber 216 is in a display position. As motor 230 rotates grow module 200 by 120 degrees in the counterclockwise direction, second chamber 214 will enter the display position, while first chamber 212 and third chamber 216 will be in the sealed positions. Motor 230 may continue to rotate grow module 200 in such increments to cycle grow chambers 210 between these sealed and display positions.

Referring now generally to FIGS. 4 through 8, grow module 200 will be described in more detail according to an exemplary embodiment of the present subject matter. As shown, grow module 200 defines a plurality of apertures 240 which are generally configured for receiving plant pods 242 into an internal root chamber 244. Plant pods 242 generally contain seedlings or other material for growing plants positioned within a mesh or other support structure through which roots of plants 124 may grow within grow module 200. A user may insert a portion of plant pod 242 (e.g., a seed end or root end 246) having the desired seeds through one of the plurality of apertures 240 into root chamber 244. A plant end 248 of the plant pod 242 may remain within grow chamber 210 such that plants 124 may grow from grow module 200 such that they are accessible by a user. In this regard, grow module 200 defines root chamber 244, e.g., within at least one of central hub 202 and the plurality of partitions 206. As will be explained below, water and other nutrients may be supplied to the root end 246 of plant pods 242 within root chamber 244. Notably, apertures 240 may be covered by a flat flapper seal (not shown) to prevent water from escaping root chamber 244 when no plant pod 242 is installed.

Figure 7:
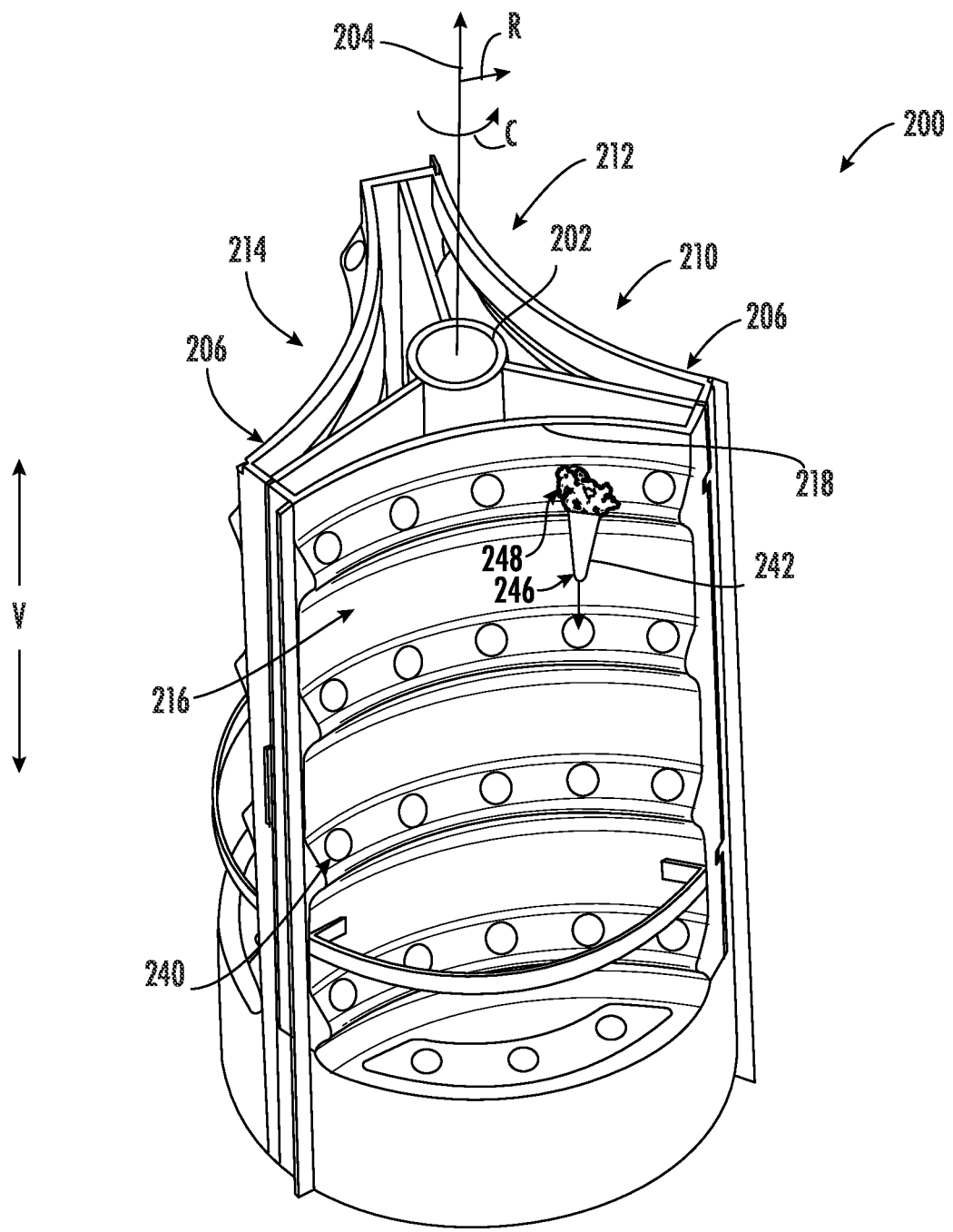
FIG. 7 provides a perspective cross sectional view of the exemplary grow module of FIG. 6 according to another exemplary embodiment of the present subject matter.
Figure 8:
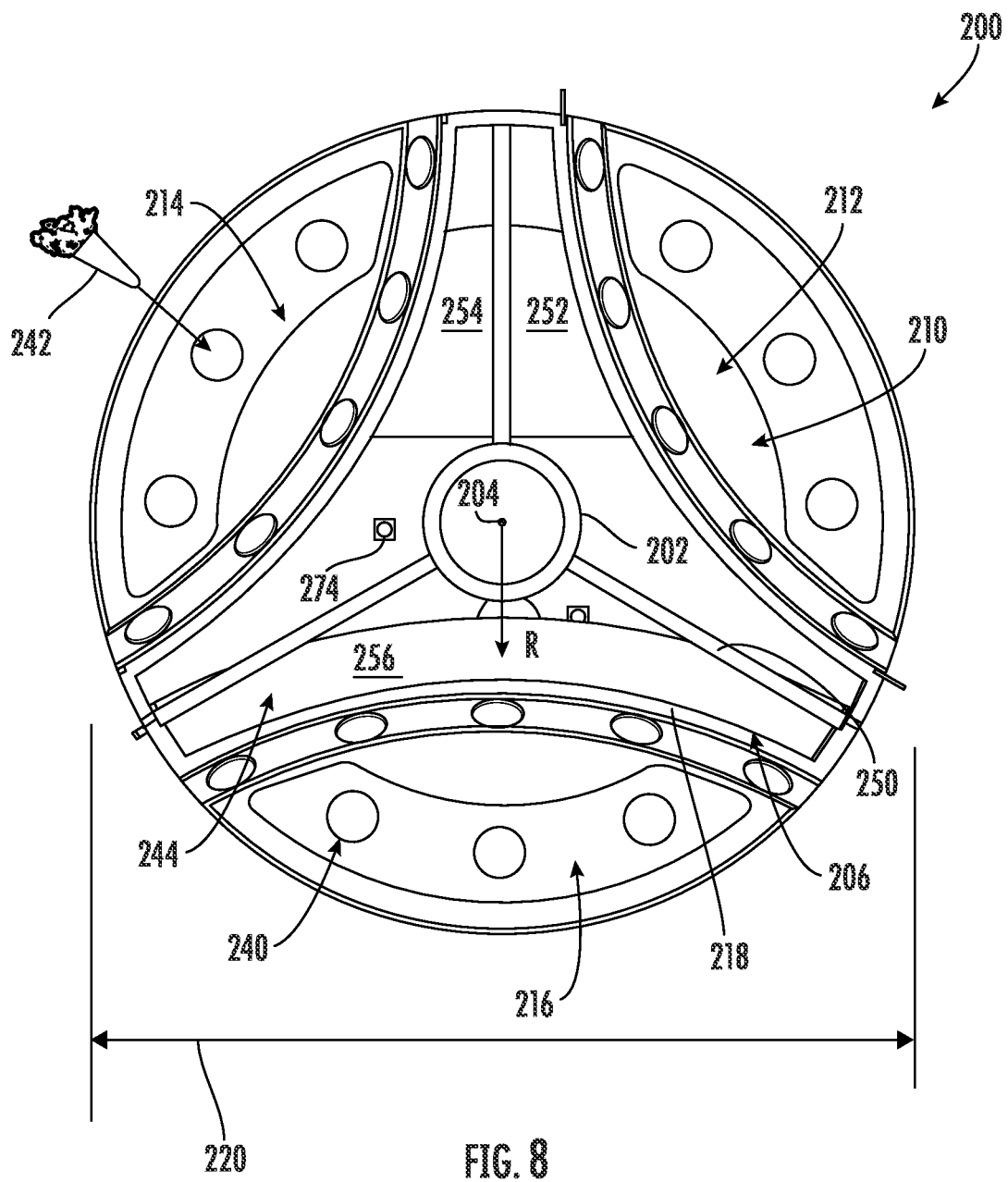
FIG. 8 provides a top cross-sectional view of the exemplary grow module of FIG. 6 according to another exemplary embodiment of the present subject matter.

As best shown in FIGS. 5 and 7, grow module 200 may further include an internal divider 250 that is positioned within root chamber 244 to divide root chamber 244 into a plurality of root chambers, each of the plurality of root chambers being in fluid communication with one of the plurality of grow chambers 210 through the plurality of apertures 240. More specifically, according to the illustrated embodiment, internal divider 250 may divide root chamber 244 into a first root chamber 252, a second root chamber 254, and a third root chamber 256. According to an exemplary embodiment, first root chamber 252 may provide water and nutrients to plants 124 positioned in the first grow chamber 212, second root chamber 254 may provide water and nutrients to plants 124 positioned in the second grow chamber 214, and third root chamber 256 may provide water and nutrients to plants 124 positioned in the third grow chamber 216. In this manner, environmental control system 148 may control the temperature and/or humidity of each of the plurality of chambers 212-216 and the plurality of root chambers 252-256 independently of each other.

Environmental control system 148 may further include a hydration system 270 which is generally configured for providing water to plants 124 to support their growth. Specifically, according to the illustrated embodiment, hydration system 270 generally includes a water supply 272 and misting device 274 (e.g., such as a fine mist spray nozzle or nozzles). For example, water supply 272 may be a reservoir containing water (e.g., distilled water) or may be a direct connection municipal water supply. According to exemplary embodiments, hydration system 270 may include one or more pumps 276 (see FIG. 15) for providing a flow of liquid nutrients to misting device 274. In this regard, for example, water or nutrients that are not absorbed by roots of plants 124 may fall under the force of gravity into a sump 278. Pump 276 may be fluidly coupled to sump 278 to recirculate the water through misting device 274.

Misting device 274 may be positioned at a bottom of root chamber 244 and may be configured for charging root chamber 244 with mist for hydrating the roots of plants 124. Alternatively, misting devices 274 may pass through central hub 204 along the vertical direction V and periodically include a nozzle for spraying a mist or water into root chamber 244. Because various plants 124 may require different amounts of water for desired growth, hydration system 270 may alternatively include a plurality of misting devices 274, e.g., all coupled to water supply 272, but being selectively operated to charge each of first root chamber 252, second root chamber 254, and third root chamber 256 independently of each other.

Referring now for example to FIGS. 4 and 5, gardening appliance 100 may further include a light assembly 280 which is generally configured for providing light into selected grow chambers 210 to facilitate photosynthesis and growth of plants 124. As shown, light assembly 280 may include a plurality of light sources 282 stacked in an array, e.g., extending along the vertical direction V. For example, light sources 282 may be mounted directly to liner 120 within grow chamber 122, or may alternatively be positioned behind liner 120 such that light is projected through a transparent window or light pipe into grow chamber 122. The position, configuration, and type of light sources 282 described herein are not intended to limit the scope of the present subject matter in any manner.

Light sources 282 may be provided as any suitable number, type, position, and configuration of electrical light source(s), using any suitable light technology and illuminating in any suitable color. For example, according to the illustrated embodiment, light source 282 includes one or more light emitting diodes (LEDs), which may each illuminate in a single color (e.g., white LEDs), or which may each illuminate in multiple colors (e.g., multi-color or RGB LEDs) depending on the control signal from controller 174. However, it should be appreciated that according to alternative embodiments, light sources 282 may include any other suitable traditional light bulbs or sources, such as halogen bulbs, fluorescent bulbs, incandescent bulbs, glow bars, a fiber light source, etc.

Notably, light sources 282 may generate a considerable amount of heat during operation. As a result, it may be desirable that gardening appliance 100 include systems for cooling light assembly 280. Referring briefly to FIGS. 9 through 14, gardening appliance 100 may include a light cooling duct 284 and a cooling fan 286 for urging a flow of cooling air through the light cooling duct 284 to cool light sources 282. For example, each light assembly (e.g., in first chamber 212 and second chamber 214) may include a separate light cooling duct 284 within which the control electronics or a portion of light sources 282 may be positioned. In this manner, cooling fans 286 may be selectively operated to urge a flow of cooling air from their respective grow chambers 212, 214 over light sources 282 to maintain suitable operating temperature.

As explained above, light generated from light assembly 280 may result in light pollution within a room where gardening appliance 100 is located. Therefore, aspects of the present subject matter are directed to features for reducing light pollution, or to the blocking of light from light sources 282 through front display opening 132. Specifically, as illustrated, light assembly 280 is positioned only within the enclosed back portion 130 of liner 120 such that only grow chambers 210 which are in a sealed position are exposed to light from light sources 282. Specifically, grow module 200 acts as a physical partition between light assemblies 280 and front display opening 132. In this manner, as illustrated in FIG. 5, no light may pass from first chamber 212 or second chamber 214 through grow module 200 and out through front display opening 132. As grow module 200 rotates, two of the three grow chambers 210 will receive light from light assembly 280 at a time. According still other embodiments, a single light assembly may be used to reduce costs, whereby only a single grow chamber 210 will be lit at a single time.

Notably, environmental control system 148 described above is generally configured for regulating the temperature, humidity (e.g., or some other suitable water level quantity or measurement), lighting profile, and other grow parameters within one or all of the plurality of chambers 210 and/or root chambers 252-256 independently of each other. In this manner, a versatile and desirable growing environment may be obtained for each and every chamber 210.

Gardening appliance 100 and grow module 200 have been described above to explain an exemplary embodiment of the present subject matter. However, it should be appreciated that variations and modifications may be made while remaining within the scope of the present subject matter. For example, according to alternative embodiments, gardening appliance 100 may be a simplified to a two-chamber embodiment with a square liner 120 and a grow module 200 having two partitions 206 extending from opposite sides of central hub 202 to define a first grow chamber and a second grow chamber. According to such an embodiment, by rotating grow module 200 by 180 degrees about central axis 206, the first chamber may alternate between the sealed position (e.g., facing rear side 114 of cabinet 102) and the display position (e.g., facing front side 112 of cabinet 102). By contrast, the same rotation will move the second chamber from the display position to the sealed position.

According to still other embodiments, gardening appliance 100 may include a three chamber grow module 200 but may have a modified cabinet 102 such that front display opening 132 is wider and two of the three grow chambers 210 are displayed at a single time. Thus, first chamber 212 may be in the sealed position, while second chamber 214 and third chamber 216 may be in the display positions. As grow module 200 is rotated counterclockwise, first chamber 212 is moved into the display position and third chamber 216 is moved into the sealed position.

Referring now to FIGS. 9 through 15, a climate control system 300 will be described according to an exemplary embodiment of the present subject matter. In general, climate control system 300 may be used to adjust the temperature within chambers 210 as well as to regulate the distribution of moisture, hydration, water, etc. throughout gardening appliance 100 to improve water usage and efficiency, to facilitate independent temperature control and hydration of different sections of grow chamber 122, or to otherwise regulate the temperature, humidity, or moisture content throughout gardening appliance 100.

Figure 9:
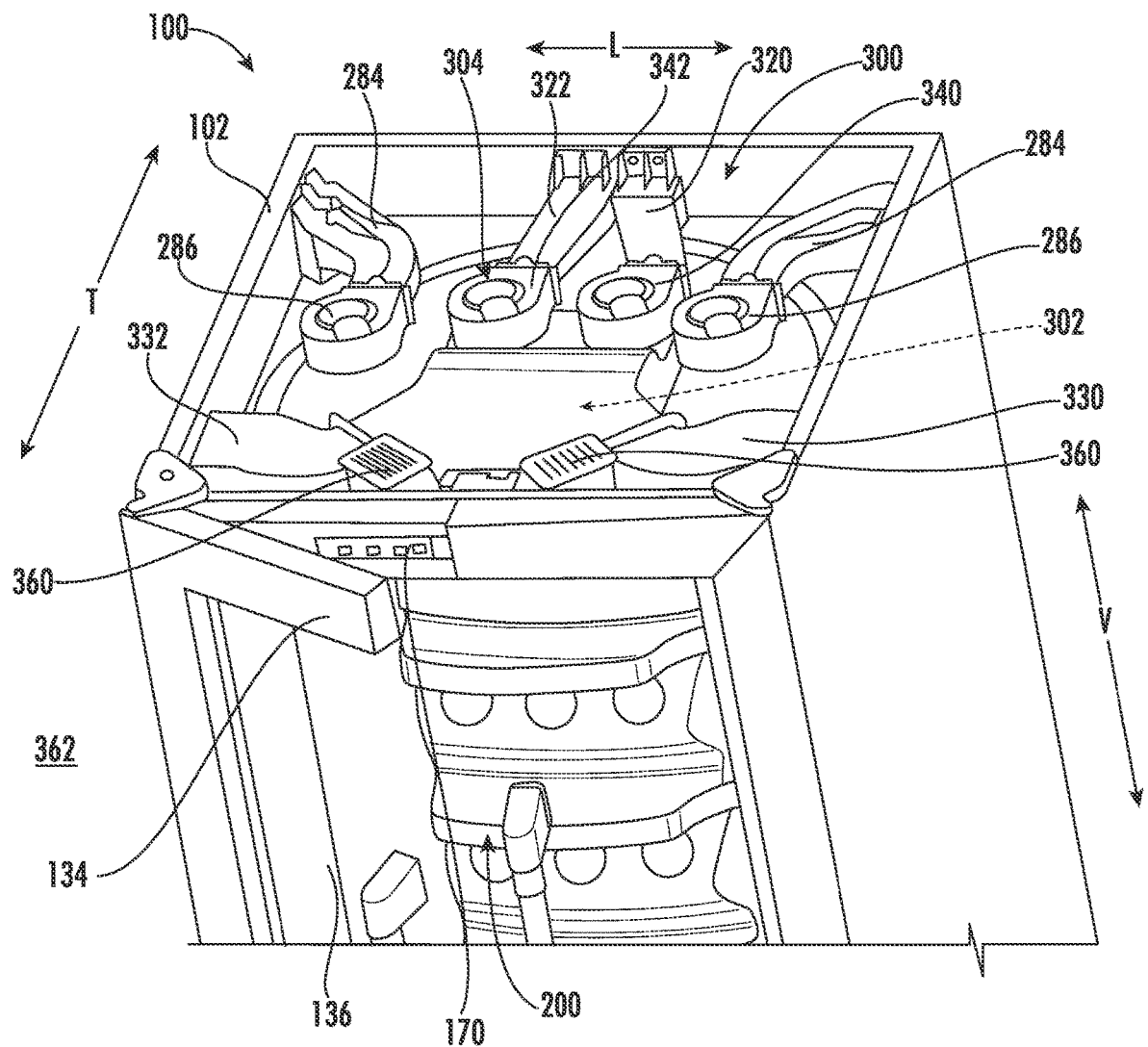
FIG. 9 provides a front perspective view of a sealed system that may be used with the exemplary gardening appliance of FIG. 1 according to an exemplary embodiment of the present subject matter.
Figure 10:
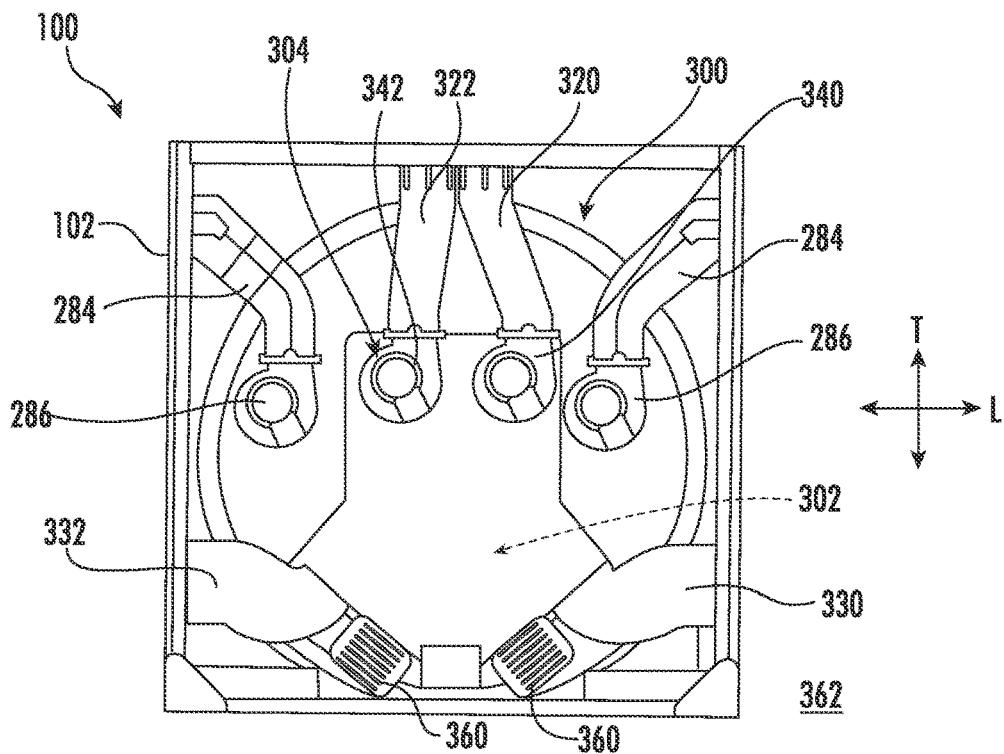
FIG. 10 provides a top view of the exemplary sealed system of FIG. 9 according to an exemplary embodiment of the present subject matter.
Figure 11:
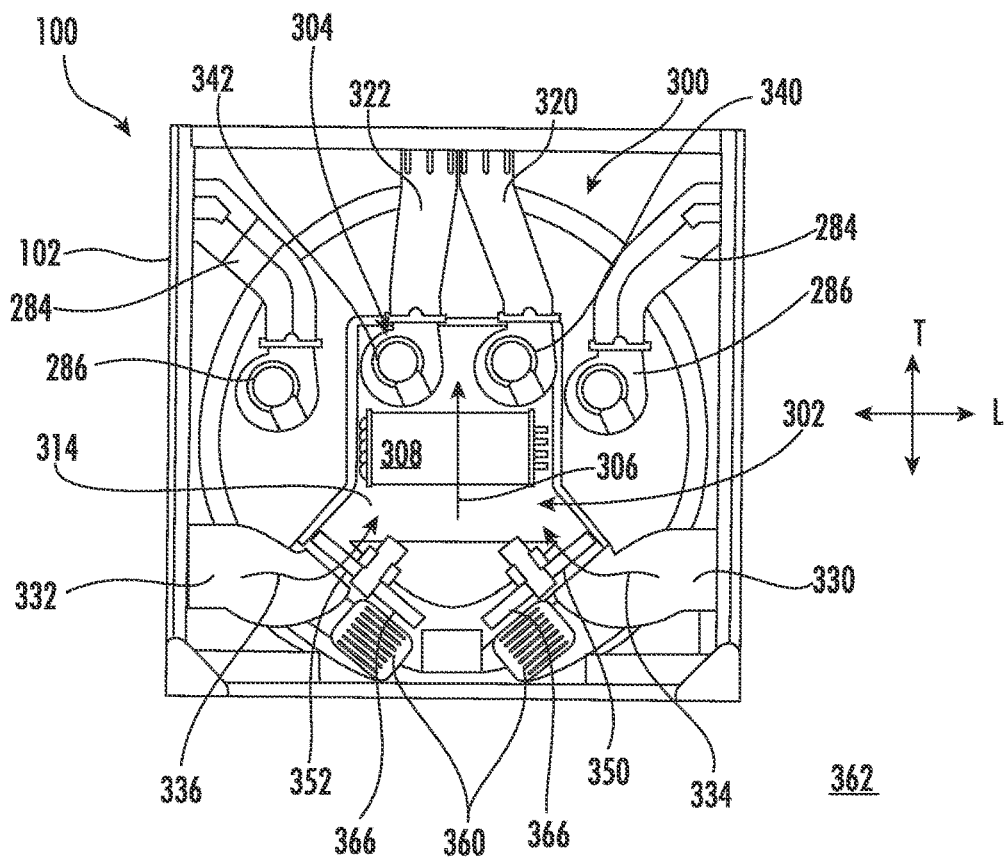
FIG. 11 provides a top view of the exemplary sealed system of FIG. 9 according to an exemplary embodiment of the present subject matter with an evaporator plenum cover removed.
Figure 12:
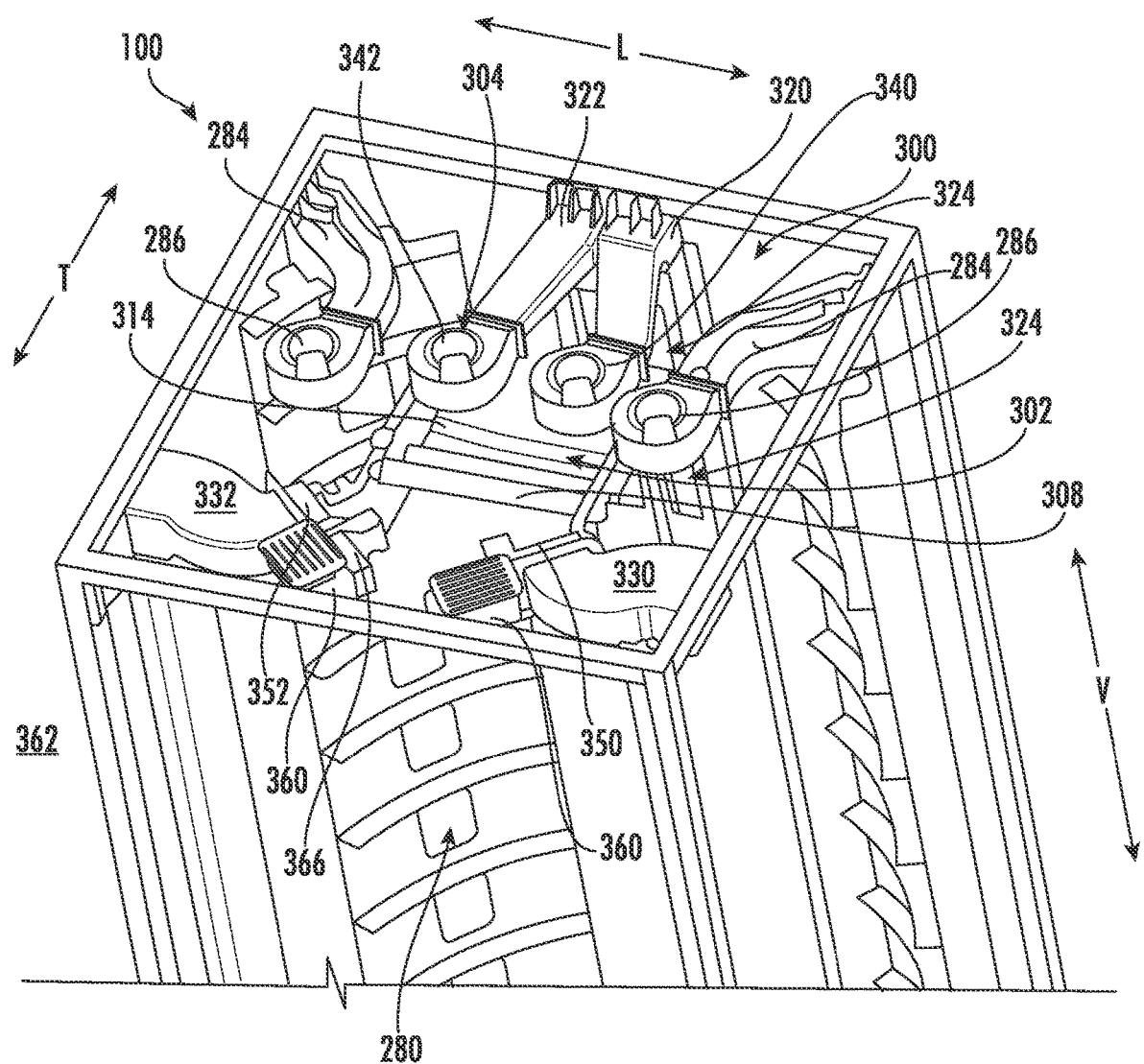
FIG. 12 provides a perspective view of the exemplary sealed system of FIG. 9 with various components of the gardening appliance removed for clarity according to an exemplary embodiment of the present subject matter.
Figure 13:
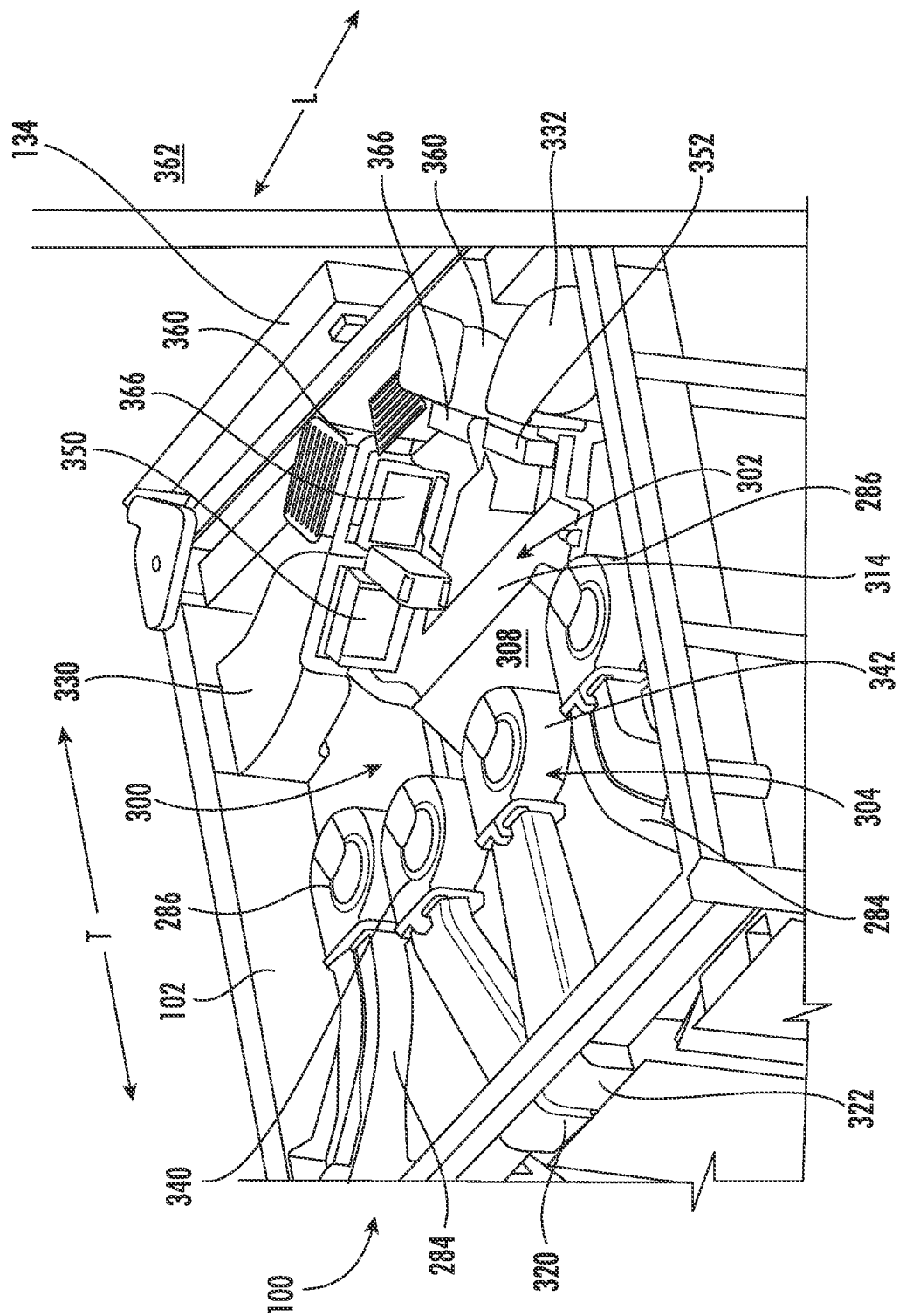
FIG. 13 provides a rear perspective view of the exemplary sealed system of FIG. 9 according to an exemplary embodiment of the present subject matter.
Figure 14:
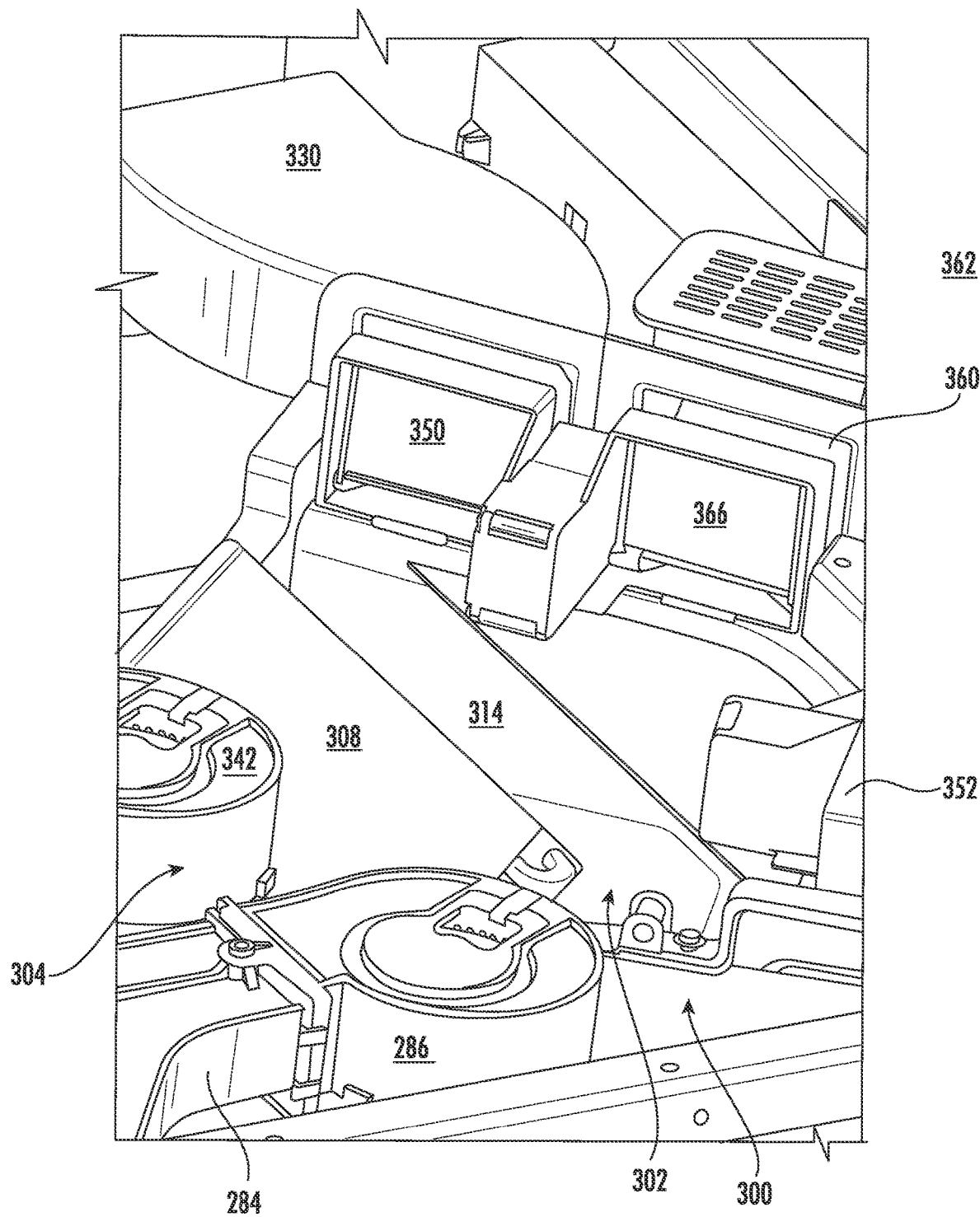
FIG. 14 provides a close-up perspective view of a damper assembly of the exemplary sealed system of FIG. 9 according to an exemplary embodiment of the present subject matter.
Figure 15:
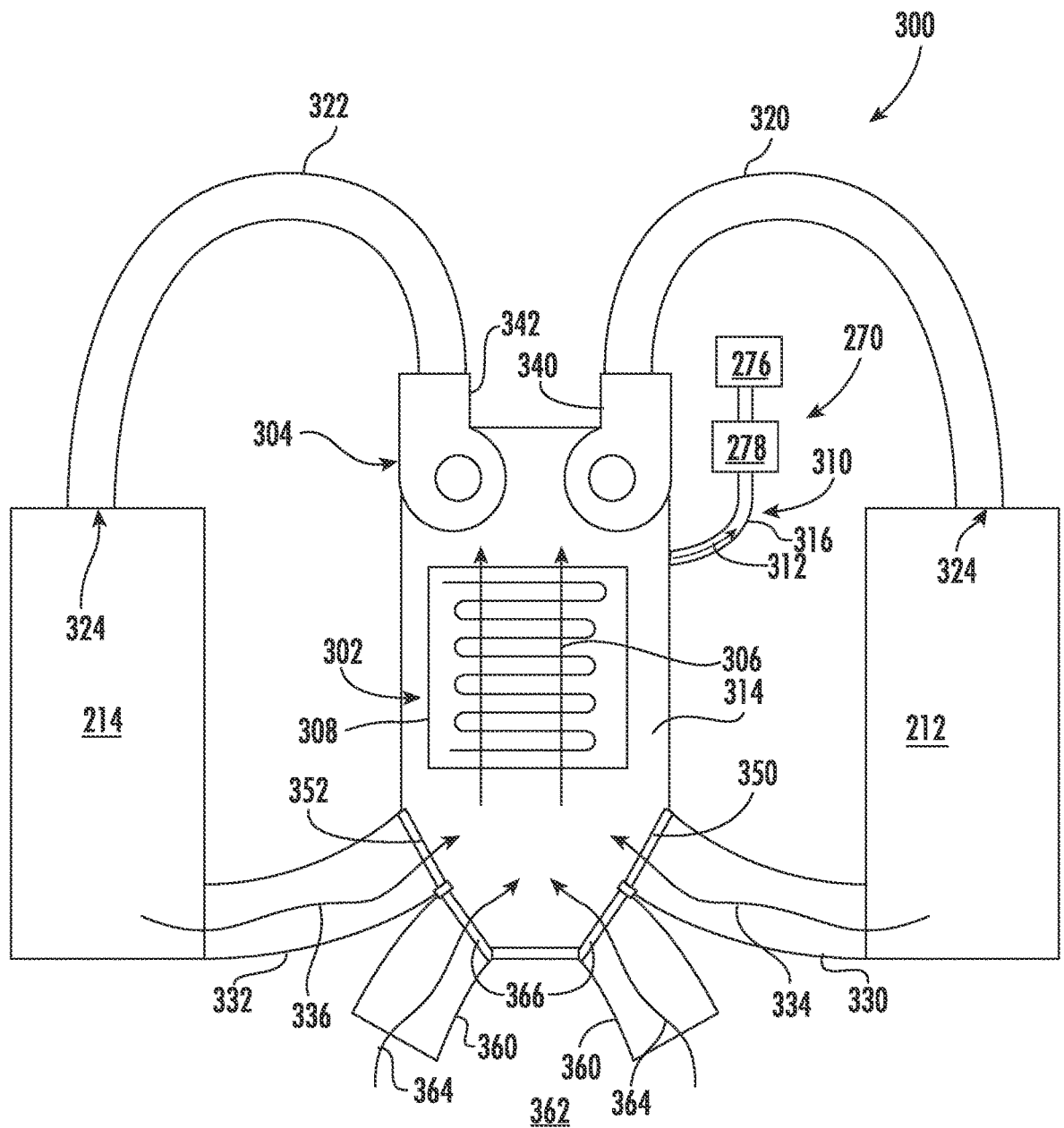
FIG. 15 provides a schematic view of the exemplary sealed system of FIG. 9 according to an exemplary embodiment of the present subject matter.

Although climate control system 300 is described herein in the context of gardening appliance 100, it should be appreciated that aspects of the present subject matter may be used to regulated temperature, hydration, and/or nutrients to plants in any other gardening appliance or in any other application where it is desirable to regulated temperature and selectively provide desirable quantities and concentrations of hydration and improve humidity control for improved plant growth. FIGS. 9 and 15 provide schematic illustrations of climate control system 300 to facilitate discussion of aspects of the present subject matter. However, it should be appreciated that variations and modifications may be made to climate control system 300 while remaining within the scope of the present subject matter.

According to the illustrated embodiment, climate control system 300 may include an evaporator plenum 302 that is in fluid communication with grow chamber 122. Climate control system 300 may further include a fan assembly 304 that is operably coupled to evaporator plenum 302 for urging a flow of air (e.g., as identified by reference numeral 306 in FIG. 15) through evaporator plenum 302. An evaporator 308 may be positioned within evaporator plenum 302 for cooling, dehumidifying, or otherwise selectively extracting water or moisture from the flow of air 306. Notably, this extracted water may be reused by hydration system 270 in a more efficient manner, as described in more detail below. The temperature regulated air may then be recirculated into grow chamber 122, e.g., when it is desirable to adjust a chamber temperature or humidity within grow chamber 122. By contrast, if the temperature is at a target temperature and/or the humidity within grow chamber 122 is suitable or too low, evaporator 308 may be warmed (or not cooled) and the air may simply be recirculated into grow chamber 122.

According to the illustrated embodiment, evaporator plenum 302 and evaporator 308 are positioned above grow module 200 along the vertical direction V. However, it should be appreciated that according to alternative embodiments, evaporator plenum 302 may be positioned at any other suitable location. In addition, according to an exemplary embodiment, evaporator 308 may be a part of sealed system 150 of gardening appliance 100. In this regard, compressor 152, condenser 156, and/or expansion valve 158 may all be positioned within mechanical compartment 140 at a bottom of cabinet 102. However, a refrigerant conduit may run refrigerant through evaporator 308 (e.g., similar to evaporator 154 as described above). According to still other embodiments, evaporator 308 may be part of a separate, dedicated sealed system or may be any other suitable device for regulating chamber temperature and/or removing moisture from the flow of air 306.

According to an exemplary embodiment, flow of air 306 may be circulated from a single grow chamber (e.g., grow chamber 122). In this regard, evaporator plenum 302 may be fluidly coupled to only a single grow chamber such that the temperature and/or humidity of the flow of air 306 may be independently regulated before recirculating the flow of air 306 back into the same grow chamber. However, it should be appreciated that according to alternative embodiments, climate control system 300 may be used to selectively and independently regulate the temperature and moisture levels within numerous grow chambers. For example, the embodiment illustrated in FIGS. 9 through 15 provides for regulation of the humidity within two grow chambers, specifically, first chamber 212 and second chamber 214 as described above and illustrated in FIG. 8. It should be appreciated that aspects of the present subject matter are not limited to temperature and humidity regulation within a single chamber or two chambers but could instead include independent regulation of any suitable number and configuration of chambers.

Notably, regardless of the number of chambers that are regulated, climate control system 300 may further include features for reusing the extracted water. Specifically, according to the illustrated embodiment, climate control system 300 includes a water return path 310 for directing the extracted water (e.g., as shown schematically by reference numeral 312 in FIG. 15) back into hydration system 270 such that it may be reused. For example, water return path 310 may simply be a series of holes or apertures defined within a bottom panel 314 of evaporator plenum 302. In this manner, extracted water 312 may drip off the evaporator 308 and fall under the force of gravity through or around grow module 200 where it may be collected in sump 278. By contrast, water return path 310 may include one or more troughs or channels (not shown) that are defined in a bottom panel 314 for collecting extracted water 312. These troughs may terminate in a conduit (e.g., such as conduit 316) which directs the flow of extracted water 312 directly back into sump 278 or a storage reservoir of hydration system 270.

In this manner, water extracted from the flow of air 306 may be used by hydration system 270 to further hydrate plants 124. This may reduce or eliminate the need for external water sources, municipal water supplies, etc. In addition, climate control system 300 provides for more efficient usage of water and/or nutrients. It should be appreciated that other means for collecting and/or using extracted water 312 are possible and within the scope of the present subject matter.

Referring again to FIGS. 9 through 15, one embodiment of climate control system 300 will be described that facilitates temperature and moisture management within two or more grow chambers. Specifically, according to the illustrated embodiment, climate control system 300 includes a first supply duct 320 that provides fluid communication between evaporator plenum 302 and first grow chamber 212. In addition, climate control system 300 includes a second supply duct 322 that provides fluid communication between evaporator plenum 302 and second grow chamber 214. Specifically, according to the illustrated embodiment, first supply duct 320 and second supply duct 322 extend downward along rear side 114 of cabinet 102 and each include a plurality of discharge apertures 324 that are spaced apart along the vertical direction V for distributing the flow of air 306 into the respective grow chambers 212, 214.

Similarly, climate control system 300 includes a first intake duct 330 that provides fluid communication between the first grow chamber 212 and evaporator plenum 302. Second intake duct 332 provides fluid communication between second grow chamber 214 and evaporator plenum 302. In this manner, as fan assembly 304 urges a flow of air 306 through evaporator plenum 302, the flow of air 306 passes into first chamber 212 and/or second chamber 214 before being drawn back into evaporator plenum 302 through intake ducts 330, 332. Specifically, a first flow of intake air 334 is drawn from first grow chamber 212 through first intake duct 330, while a second flow of intake air 336 is drawn from second grow chamber 214 through the second intake duct 332.

Fan assembly 304 may generally be any suitable number, type, and position of fans or air handlers suitable for urging a flow of air 306 through evaporator plenum 302. For example, according to an exemplary embodiment, the fan assembly 304 may include a single fan positioned downstream of evaporator 308 of any suitable type or configuration, such as an axial fan, centrifugal fan, tangential fan, etc. According to the illustrated embodiment, the fan assembly 304 includes a first fan 340 operably coupled to first supply duct 320 and a second fan 342 operably coupled to second supply duct 322. Notably, first fan 340 and second fan 342 may be operated independently of each other to selectively urge the flow of air 306 into their respective grow chambers 212, 214. Moreover, according to an exemplary embodiment, first fan 340 and second fan 342 may be configured for operating in reverse when it is desirable to prevent flow of air 306 from entering one of the first chamber 212 and/or second chamber 214. In this regard, operating first fan 340 or second fan 342 in the reverse direction creates a back pressure that prevents or restricts the flow of air 306 from entering first supply duct 320 or second supply duct 322, respectively, such that the flow of air 306 is instead urged through the opposite supply duct 320, 322.

In addition, climate control system 300 may include a system of dampers to facilitate improved distribution of flow of air 306 within gardening appliance 100. For example, according to the illustrated embodiment, climate control system 300 includes a first intake damper 350 that is operably coupled to first intake duct 330 for regulating first flow of intake air 334 into evaporator plenum 302. In addition, climate control system 300 may include a second intake damper 352 that is operably coupled to second intake duct 332 for regulating the second flow of intake air 336 into evaporator plenum 302. In this manner, for example, controller 174 may isolate one grow chamber, e.g., second grow chamber 214 from flow of air 306 by closing second intake damper 352 and operating second fan 342 in the reverse direction at a low speed. Simultaneously, controller 174 may operate first fan 340 and open the first intake damper 350 such that most or all of the flow of air 306 is circulated solely within first chamber 212. It should be appreciated that such operation provides improved versatility, temperature control, moisture management, and humidity control within the various chambers 212-216.

According to exemplary embodiments, climate control system 300 may further be configured for drawing in ambient air. For example, if it is particularly humid outside, climate control system 300 may draw in outdoor air to increase the amount of water or moisture within gardening appliance 100 that may be used by hydration system 270. Specifically, according to the illustrated embodiment, climate control system 300 may include one or more ambient air intakes 360, e.g., a duct that is fluidly coupled to the outdoors or to the ambient environment 362 outside of cabinet 112. Ambient air intake 360 may be fluidly coupled to evaporator plenum 302 such that a flow of ambient air (e.g., as identified generally by reference numeral 364) may pass into evaporator plenum 302 where water 312 may be extracted.

According to the illustrated embodiment, an ambient damper 366 may be operably coupled to the ambient air intake 360 for selectively permitting or preventing the flow of ambient air 364 from passing into evaporator plenum 302. Notably, according to the illustrated embodiment, climate control system 300 includes two ambient air intakes 360. However, it should be appreciated that according to alternative embodiments, any other suitable number type and position of ambient air intakes may be used. In addition, it should be appreciated that ambient air intake 360 may include any suitable filtering mechanisms or air treatment systems for treating the flow of ambient air 364 before introducing it into climate control system 300. In operation, fan assembly 304 may draw into evaporator plenum 302 the first flow of intake air 334, the second flow of intake air 336, and/or the flow of ambient air 364 in any suitable proportions.

Now that the construction of gardening appliance 100 and sealed system 150 have been presented according to exemplary embodiments, an exemplary method 400 of operating an indoor gardening appliance will be described. Although the discussion below refers to the exemplary method 400 of operating climate control system 300 and sealed system 150 of gardening appliance 100, one skilled in the art will appreciate that the exemplary method 400 is applicable to the operation of a variety of other gardening appliances. In exemplary embodiments, the various method steps as disclosed herein may be performed by controller 174 or a separate, dedicated controller.

Figure 16:
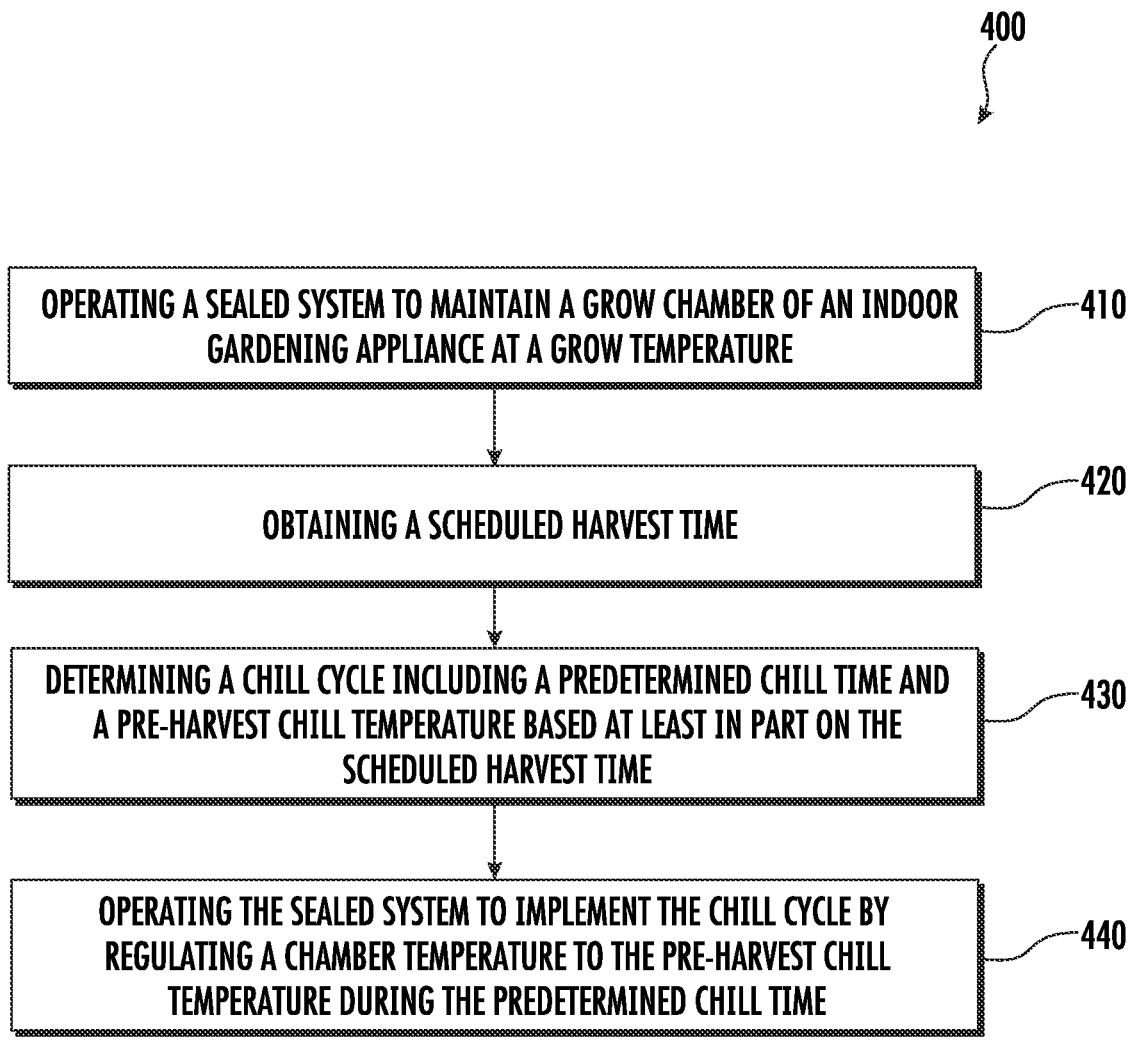
FIG. 16 illustrates a method for operating a sealed system of an indoor gardening appliance in accordance with one embodiment of the present disclosure.

Referring now to FIG. 16, method 400 includes, at step 410, operating a sealed system to maintain a grow chamber of an indoor gardening appliance at a grow temperature. In this regard, continuing the example from above, climate control system 300 and sealed system 150 may operate together to regulate a temperature of grow chamber 122 to any suitable temperature that facilitates growth of plants 124. According to exemplary embodiments, the grow temperature generally refers to the nominal growing temperature maintained within grow chamber 122 throughout the growth of plants 124 (e.g., not including the during chill cycle, described below). Although step 410 refers to maintaining a single grow chamber at a single grow temperature, it should be appreciated that method 400 may further include independent regulation of any suitable number of grow chambers at any suitable temperatures.

Step 420 includes obtaining a scheduled harvest time. In this regard, the scheduled harvest time generally refers to the time when one or more plants 124 are to be harvested, e.g., removed from gardening appliance 100 for consumption.

Thus, the scheduled harvest time may include the date and time of harvest and may include a corresponding notification to a user of gardening appliance 100, e.g., instructing the user to perform the harvesting process. It should be appreciated that the scheduled harvest time may be determined in any suitable manner. For example, controller 174 of gardening appliance 100 may monitor the growth of plants 124 within grow chamber 122 throughout their lifetime and may be programmed to determine the optimal harvesting time for each plant 124. According to still other embodiments, a user of gardening appliance 100 may communicate with controller 174 (e.g., via a remote device such as a mobile phone) regarding the desired harvest time. In this regard, the user's remote device may include a software application where a user can select each respective plant 124 within gardening appliance 100 and assign a desired harvest time, select from recommended harvest time, etc.

Step 430 includes determining a chill cycle including a predetermined chill time and a pre-harvest chill temperature based at least in part on the scheduled harvest time. In this regard, as noted above, certain plants 124 may taste better or have improved characteristics if exposed to a frost shortly prior to harvesting. In this regard, plants 124 that are exposed to frost may naturally produce additional sugars or otherwise change their growth characteristics when exposed to a frost. This sugar production or change in growth characteristics may result in a better tasting plants 124. As a result, aspects of the present subject matter are directed to implementing a chilling or frosting cycle in one or more grow chambers to improve the quality of plants 124 located in the respective grow chambers.

As used herein, the terms "chill cycle," "frost cycle," and the like are generally intended to refer to periods of reduced temperature and or increased moisture content within one or more grow chambers 122. In this regard, these chill cycles may be implemented by climate control system 300, e.g., by reducing the temperature within one or more grow chambers to a temperature lower than the standard operating grow temperature. According to exemplary embodiments, these chill cycles may be intended to generate actual frost or frozen water on the leaves or vegetation of plants 124. However, according still other embodiments, a chill cycle or frost cycle may include the implementation of any other suitable temperature profile or adjustment relative to the standard grow temperature within grow chamber 122.

The parameters of the chill cycle may be determined in any suitable manner. For example, a user may directly input the desired predetermined chill time and pre-harvest chill temperature for a particular plant or plants 124. Alternatively, a user may insert a particular plant 124 at a particular location within grow chamber 122 and may inform controller 174 of the type position. Controller 174 may be programmed with information related to the ideal chill cycle for that plant and may implement that chill cycle upon receiving a scheduled harvest time. For example, controller 174 may include a lookup table or may have access to an external database that stores all potential plants that may be positioned within grow chamber 122 along with their standard growing temperatures and their chill cycle information. After the scheduled harvest time is obtained at step 420, step 430 may include accessing the lookup table or database to determine the desired chill cycle parameters.

Notably, according to exemplary embodiments, the chill cycle may be initiated at a predetermined time before the scheduled harvest time. In this regard, for example, the predetermined time for initiating the chill cycle may be between about 12 hours and 10 days, between about 18 hours and 7 days, between about 1 day and 5 days, or about 2 days prior to the scheduled harvest time. Notably, the predetermined time for initiating a chill cycle may be selected such that there is sufficient time after the frost for the plants 124 to begin generating sugars and otherwise responding to the chill cycle.

It should be appreciated that the predetermined chill time is the time that the temperature within grow chamber 122 is lowered in order to initiate the benefits of a frost or cold period before harvest. According to exemplary embodiments, the predetermined chill time may be between about 1 hour and 24 hours, between about 2 hour and 18 hours, between about 3 and 14 hours, or about 12 hours. It should be appreciated that any other suitable predetermined chill time may be used while remaining within the scope of the present subject matter.

In addition, it should be appreciated that the pre-harvest chill temperature may be selected in any suitable manner for initiating the benefits of a pre-harvest frost or cold period. For example, the pre-harvest chill temperature may be a temperature selected to initiate a frost on plants 124 and grow chamber 122. According to exemplary embodiments, the pre-harvest chill temperature may be a temperature below 42° F., below 36° F., below 32° F., or any other suitable temperature. Furthermore, it should be appreciated that the pre-harvest chill temperature may vary during the chill cycle or during the predetermined chill time. Other suitable temperatures are possible and within the scope of the present subject matter.

Moreover, although the chill cycle is described above as including a single predetermined chill time and a single pre-harvest chill temperature, it should be appreciated that the chill cycle may include multiple different time periods during which a chill process at one or more temperatures may be implemented. Thus, according to an exemplary embodiment, the chill cycle may include a plurality of predetermined chill times and the sealed system may be configured to cycle the chamber temperature between the pre-harvest chill temperature during the plurality of predetermined chill times and the grow temperature outside of the plurality of predetermined chill times.

According to exemplary embodiments of the present subject matter, climate control system 300 may further adjust the amount of moisture within grow chamber 122 during a chill cycle. For example, hydration system 270 may be used to introduce additional moisture during a chill cycle, e.g., such moisture being intended to generate frost on plants 124. This moisture may be introduced just prior to the chill cycle, during the chill cycle, or at any other suitable time and in any suitable quantity. Variations and modifications may be made to the regulation of moisture and temperature during the chill cycle while remaining within the scope of the present subject matter.

After the chill cycle parameters are determined, step 440 includes operating the sealed system 150 and/or climate control system 300 to implement the chill cycle by regulating a chamber temperature to the pre-harvest chill temperature during the predetermined chill time. In this regard, climate control system 300 may be operated to lower the temperature, raise the temperature, lower the humidity, raise the humidity, or make any other climate adjustments necessary to implement the desired chill cycle. Moreover, although the embodiment described above focuses on adjusting the climate within a single grow chamber 122 to implement a chill cycle, it should be appreciated that aspects of the present subject matter are further directed to maintaining a plurality of sub-compartments or a separate grow chambers at different temperatures. In this regard, plants 124 within one grow chamber (e.g., first chamber 212) may benefit from the implementation of the chill cycle while plants 124 within a second grow chamber (e.g., second chamber 214) may not need a chill cycle prior to harvest. As a result, climate control system 300 may regulate the temperature and humidity within these chambers separately based on the needs of plants 124 located therein.

As described above, chill cycles are generally intended to improve the taste of plants 124 at harvest. However, it should be appreciated that aspects of the present subject matter may be applied at other points during the plant growth process to improve plant health, initiate germination, or otherwise improve operation of gardening appliance 100. In this regard, for example, certain plant seeds may germinate quicker when exposed to cold periods or chill cycles. As a result, a germination chill cycle similar to the chill cycle described above may be implemented when a new plant pod is inserted into grow chamber 122. In this regard, if the particular plant seeds in that plant pod require colder temperatures to germinate, controller 174 may implement a germination chill cycle in order to germinate those seeds. This germination chill cycle may include a predetermined germination chill time and a germination chill temperature at which the seeds contained in the plant pod may germinate optimally, e.g., by breaking the dormancy of a newly planted seed. In addition, according to exemplary embodiments, hydration system 270 may be configured for increasing humidity or directly spray seeds undergoing an germination chill cycle to moisten the seeds or surrounding soil prior to initiating the germination chill cycle.

FIG. 16 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 400 are explained using gardening appliance 100 as an example, it should be appreciated that these methods may be applied to the operation of any suitable indoor gardening appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gardening appliance, comprising:
    a liner positioned within a cabinet and defining a grow chamber;
    a grow module mounted within the liner and defining a plurality of apertures for receiving one or more plant pods, wherein the grow module divides the grow chamber into a plurality of grow chambers;
    a motor mechanically coupled to the grow module for selectively rotating the grow module;
    a sealed system in thermal communication with the grow chamber for regulating a temperature within the grow chamber; and
    a controller operably coupled to the motor and the sealed system, the controller being configured to:
        operate the sealed system to maintain the grow chamber at a grow temperature;
        obtain a scheduled harvest time;
        determine a chill cycle including a predetermined chill time and a pre-harvest chill temperature based at least in part on the scheduled harvest time, wherein the pre-harvest chill temperature is selected to generate frost within the grow chamber;
        operate the sealed system to implement the chill cycle in a target grow chamber of the plurality of grow chambers by regulating a chamber temperature to the pre-harvest chill temperature during the predetermined chill time;
        identify a pod location of a plant being grown within a target pod of the one or more plant pods; and
        operate the motor to rotate the grow module to position the pod location within the target grow chamber during the chill cycle.

2. The gardening appliance of claim 1, wherein the chill cycle is initiated at a predetermined time before the scheduled harvest time.

3. The gardening appliance of claim 2, wherein the predetermined time before the scheduled harvest time is between five days and one day before the scheduled harvest time.

4. The gardening appliance of claim 2, wherein the predetermined time before the scheduled harvest time is about two days before the scheduled harvest time.

5. The gardening appliance of claim 1, wherein the predetermined chill time is less than 12 hours.

6. The gardening appliance of claim 1, wherein the chill cycle comprises a plurality of predetermined chill times, the sealed system being configured to cycle the chamber temperature between the pre-harvest chill temperature during the plurality of predetermined chill times and the grow temperature outside of the plurality of predetermined chill times.

7. The gardening appliance of claim 1, wherein the sealed system is configured for maintaining at least two of the plurality of grow chambers at a different temperature.

8. The gardening appliance of claim 7, wherein a first chamber of the plurality of grow chambers is maintained at the grow temperature and a second chamber of the plurality of grow chambers is maintained at the pre-harvest chill temperature.

9. The gardening appliance of claim 1, wherein the sealed system comprises:
    a condenser, an expansion device, and an evaporator fluidly coupled through a refrigerant conduit; and
    a compressor operably coupled to the refrigerant conduit for circulating a flow of refrigerant through the refrigerant conduit.

10. The gardening appliance of claim 1, wherein the pre-harvest chill temperature is selected to initiate a frost on plants in the grow chamber.

11. The gardening appliance of claim 10, wherein the pre-harvest chill temperature is below 36 degrees Fahrenheit.

12. The gardening appliance of claim 1, wherein the scheduled harvest time is received from a remote device.

13. The gardening appliance of claim 1, further comprising:
 a hydration system for selectively introducing moisture into the grow chamber, wherein the controller is further configured for introducing moisture prior to or during the chill cycle.

14. A method of operating a sealed system of a gardening appliance, the gardening appliance comprising a grow chamber, a grow module rotatably mounted within the grow chamber and dividing the grow chamber into a plurality of grow chambers, a motor mechanically coupled to the grow module for selectively rotating the grow module, and a sealed system in thermal communication with the grow chamber for regulating a temperature within the grow chamber, the method comprising:
 operating the sealed system to maintain the grow chamber at a grow temperature;
 obtaining a scheduled harvest time;
 determining a chill cycle including a predetermined chill time and a pre-harvest chill temperature based at least in part on the scheduled harvest time, wherein the pre-harvest chill temperature is selected to generate frost within the grow chamber;
 operating the sealed system to implement the chill cycle in a target grow chamber of the plurality of grow chambers by regulating a chamber temperature to the pre-harvest chill temperature during the predetermined chill time;
 identify a pod location of a plant being grown within a target pod of the one or more plant pods; and
 operate the motor to rotate the grow module to position the pod location within the target grow chamber during the chill cycle.

15. The method of claim 14, wherein the chill cycle is initiated at a predetermined time before the scheduled harvest time.

16. The method of claim 15, wherein the predetermined time before the scheduled harvest time is between five days and one day before the scheduled harvest time.

17. The method of claim 15, wherein the predetermined time before the scheduled harvest time is about two days before the scheduled harvest time.

18. The method of claim 14, wherein the predetermined chill time is less than 12 hours.

19. The method of claim 14, wherein the chill cycle comprises a plurality of predetermined chill times, the sealed system being configured to cycle the chamber temperature between the pre-harvest chill temperature during the plurality of predetermined chill times and the grow temperature outside of the plurality of predetermined chill times.

* * * * *